Nov. 26, 1968 W. B. KLEES ET AL 3,413,419
ARRANGEMENTS IN A COMMUNICATION SWITCHING SYSTEM
USING SIGNAL EQUIPMENT BETWEEN SENDERS AND
SELECTOR SWITCHING UNITS
Filed Nov. 27, 1964 25 Sheets-Sheet 1

INVENTORS
William B. Klees
William R. Wedmore
BY C. A. Gulbrandsen
ATTY.

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 2

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964

25 Sheets-Sheet 6

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 7

Nov. 26, 1968 W. B. KLEES ET AL 3,413,419

ARRANGEMENTS IN A COMMUNICATION SWITCHING SYSTEM
USING SIGNAL EQUIPMENT BETWEEN SENDERS AND
SELECTOR SWITCHING UNITS

Filed Nov. 27, 1964 25 Sheets-Sheet 8

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 10

Nov. 26, 1968 W. B. KLEES ET AL 3,413,419

ARRANGEMENTS IN A COMMUNICATION SWITCHING SYSTEM
USING SIGNAL EQUIPMENT BETWEEN SENDERS AND
SELECTOR SWITCHING UNITS

Filed Nov. 27, 1964 25 Sheets-Sheet 14

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 15

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 19

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 21

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 22

Nov. 26, 1968 W. B. KLEES ET AL 3,413,419

ARRANGEMENTS IN A COMMUNICATION SWITCHING SYSTEM USING SIGNAL EQUIPMENT BETWEEN SENDERS AND SELECTOR SWITCHING UNITS

Filed Nov. 27, 1964 25 Sheets-Sheet 24

3,413,419
Patented Nov. 26, 1968

3,413,419

ARRANGEMENTS IN A COMMUNICATION SWITCHING SYSTEM USING SIGNAL EQUIPMENT BETWEEN SENDERS AND SELECTOR SWITCHING UNITS

William B. Klees, Chicago, and William R. Wedmore, Glen Ellyn, Ill., assignors to Automatic Electric Laboratories, Inc., Northlake, Ill., a corporation of Delaware Filed Nov. 27, 1964, Ser. No. 414,174
11 Claims. (Cl. 179—18)

ABSTRACT OF THE DISCLOSURE

A system is disclosed in which all routing digits for all possible routes are supplied from the translator to register storage before a selector is seized so that it not necessary to recall the translator if an alternate route must be used.

This invention relates to arangements used in a communication switching system, and more particularly to signaling arrangements used in a group selector switching unit.

A switching unit, such as a group selector, comprises a switching network for making connections between calling side terminals or inlets and called side terminals or outlets. In many cases an individual line relay is connected to each line at the calling side to operate in response to a service request call signal on the line, and at a set of its contacts connects a source of potential to a conductor to signal the switching control equipment. If signal equipment such as a register or code receiver is to be connected to the calling line to receive digital signals designating the destination of the call, auxiliary switching apparatus may be actuated in response to the signal from the line relay to make the connection to the signal equipment. Other auxiliary switching apparatus may be used to apply a marking potential to the calling line terminal at the principal switching network to be used in extending a connection to a called line terminal.

An object of the invention is to provide an arrangement to connect a signal equipment to a calling line, and to apply a marking potential to the network terminal for the line, with a minimum of auxiliary switching equipment.

According to the invention, the connection from the calling line to the switching equipment is provided by additional contacts of the line relay. Since more than one line may be requesting service and the signal equipment must be connected to receive signals from only one line at a time, the arrangement according to the invention provides a holding connection for the line relay to the marking conductor at the network terminal, thereby using the switching equipment which applies the marking potential, only one line at a time being selected and marked by the switching control equipment. The other line relays are then released at a common point. In one embodiment each line relay has one winding connected to the line, and another winding connected to the marking conductor, the line windings of all of the relays being connected in multiple to a common potential source which is opened to release them.

Another object of the invention is to provide an arrangement in a group selector marker for use in a register-sender-translator switching system such that after the selector marker has scanned all of the primary route outlets and found all trunks busy, it is not necessary to again access the translator to obtain information concerning an alternate route either for routing through the selector or for instructions for outpulsing.

According to a feature of the invention, the group selector marker is provided with an alternate route scanner and an arrangement such that for given switching digits received from the translator via the sender the marker is arranged to scan a primary route set of outlets and all alternate route outlets for the destination level indicated by the switching digits, and also includes an arrangement for supplying special instructions corresponding to the particular alternate route in which the selected outlet is located, these special instructions being supplied from the marker to the sender to control subsequent outpulsing of digits to the distant office. In addition if the selected outlet is connected to a trunk requiring ticketing, the identification of the outlet is supplied from the marker to the common control equipment for forwarding to the ticketing equipment.

The above-mentioned and other objects and features of this invention and the manner of attaining them will become more apparent, and the invention itself will be best understood, by reference to the following description of an embodiment of the invention taken in conjunction with the acompanying drawings comparising FIGS. 1 to 24 wherein.

Figure 1:
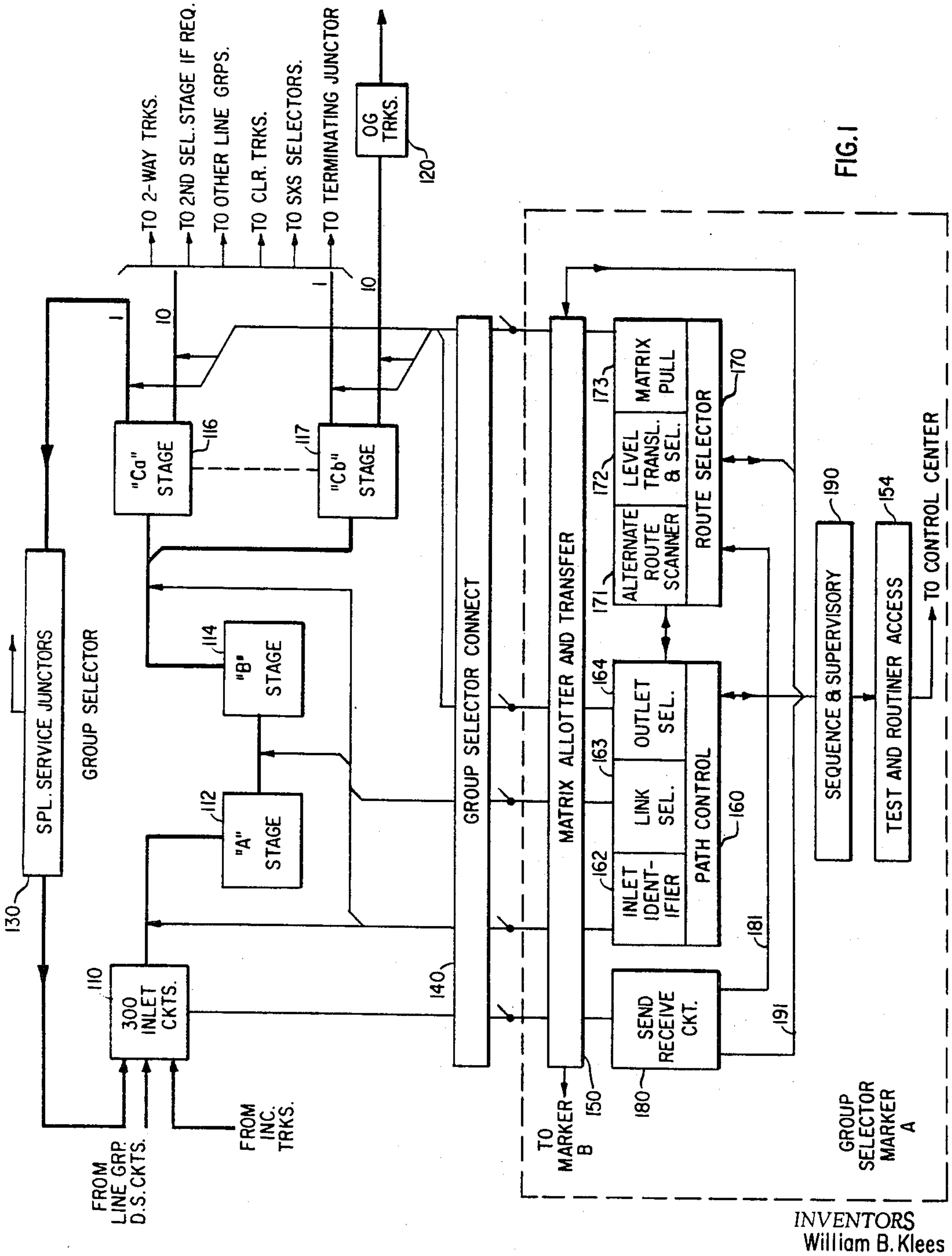
FIG. 1 is a single line block diagram of a group selector and marker.
Figure 2:
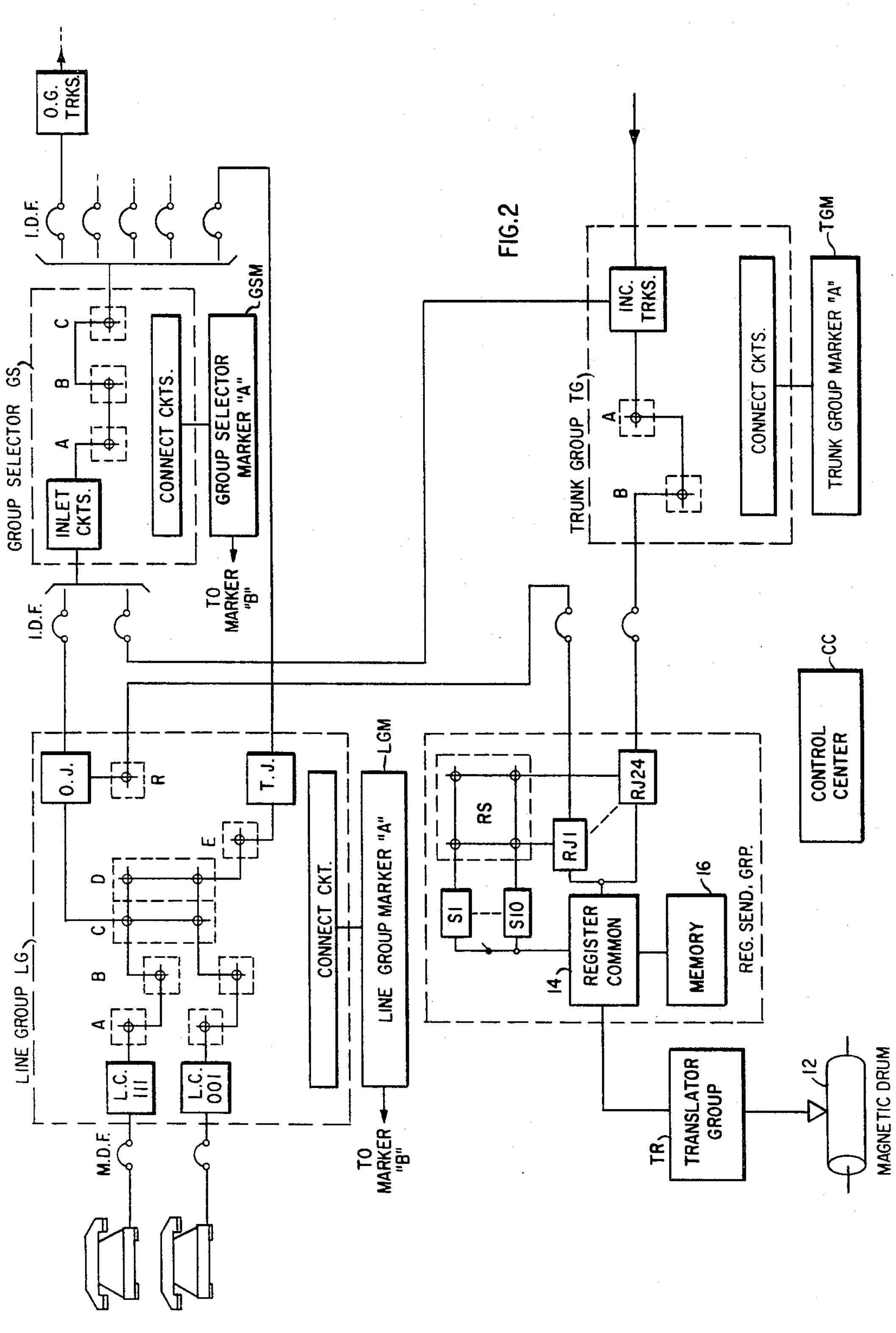
FIG. 2 is a single line block diagram of a telephone switching system including the group selector.
Figure 3:
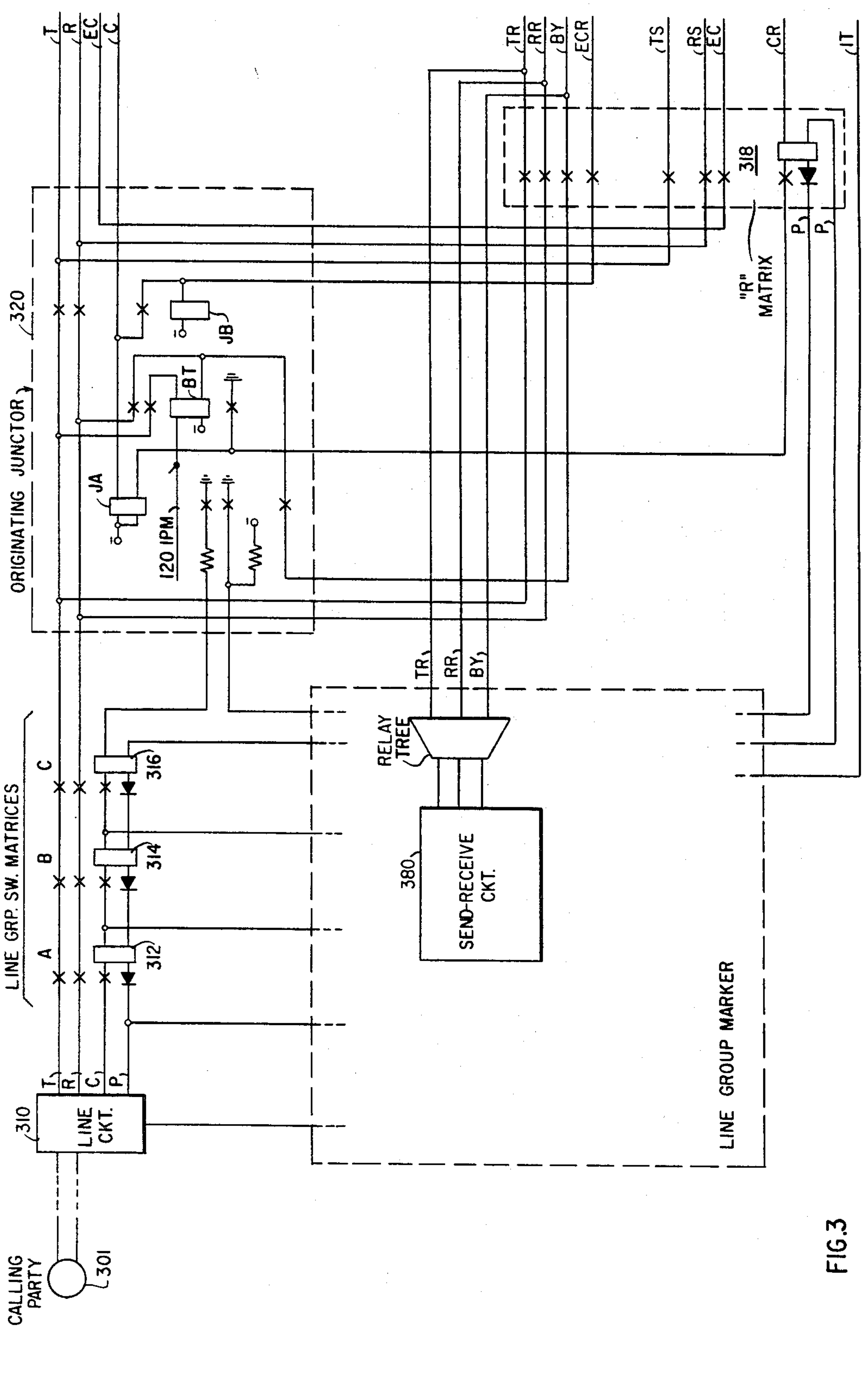
Figure 4:
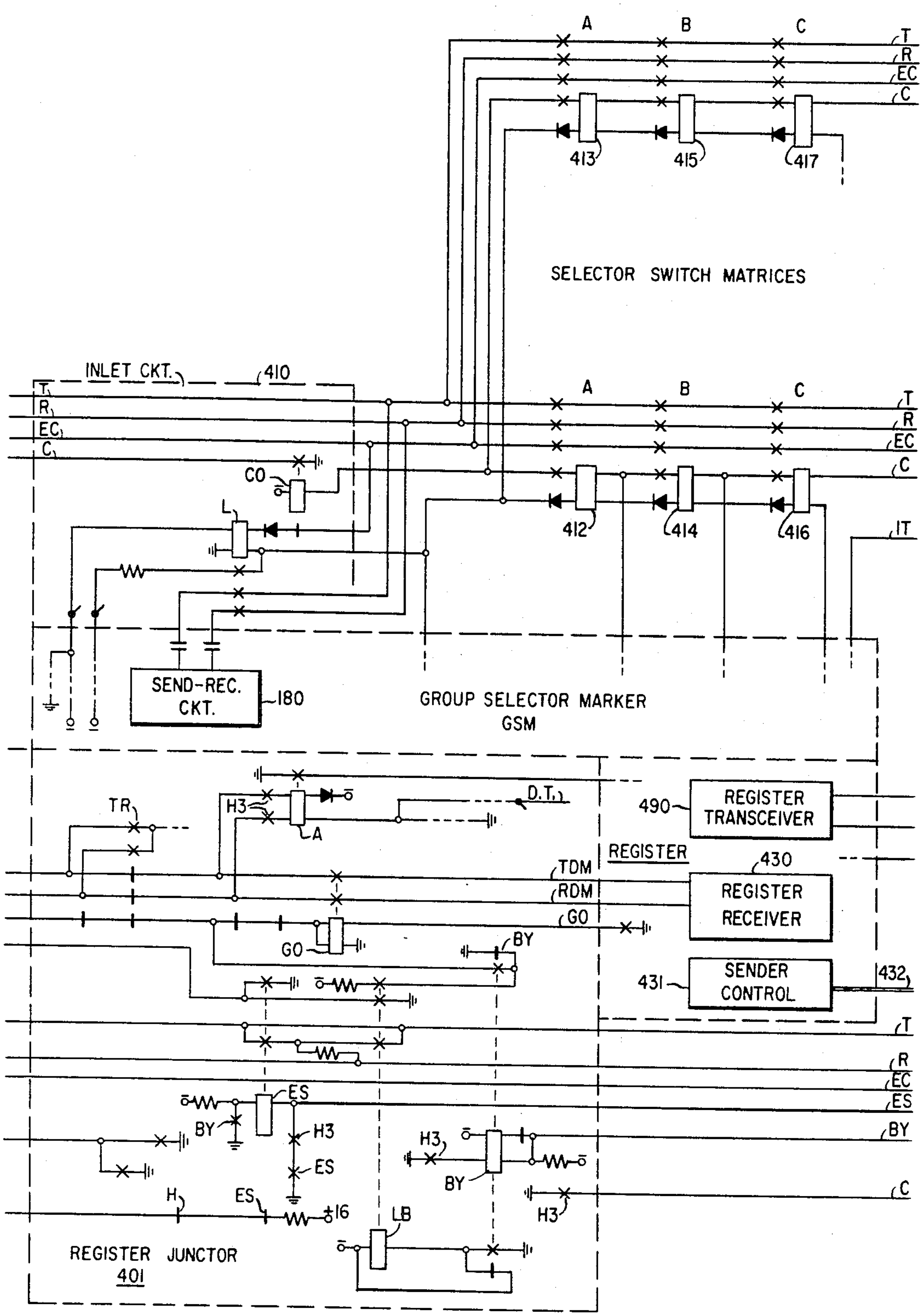
Figure 5:
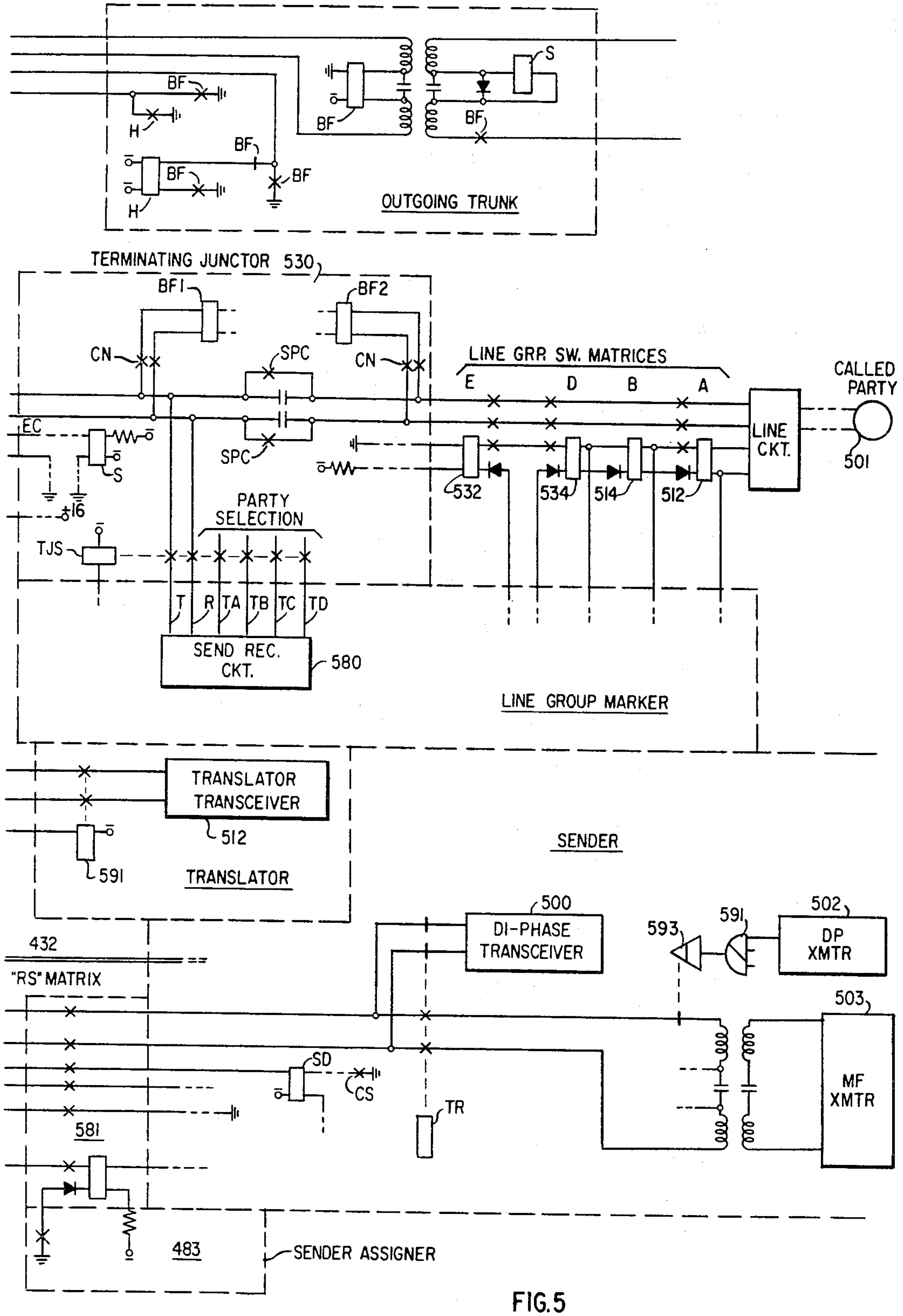
Figure 14:
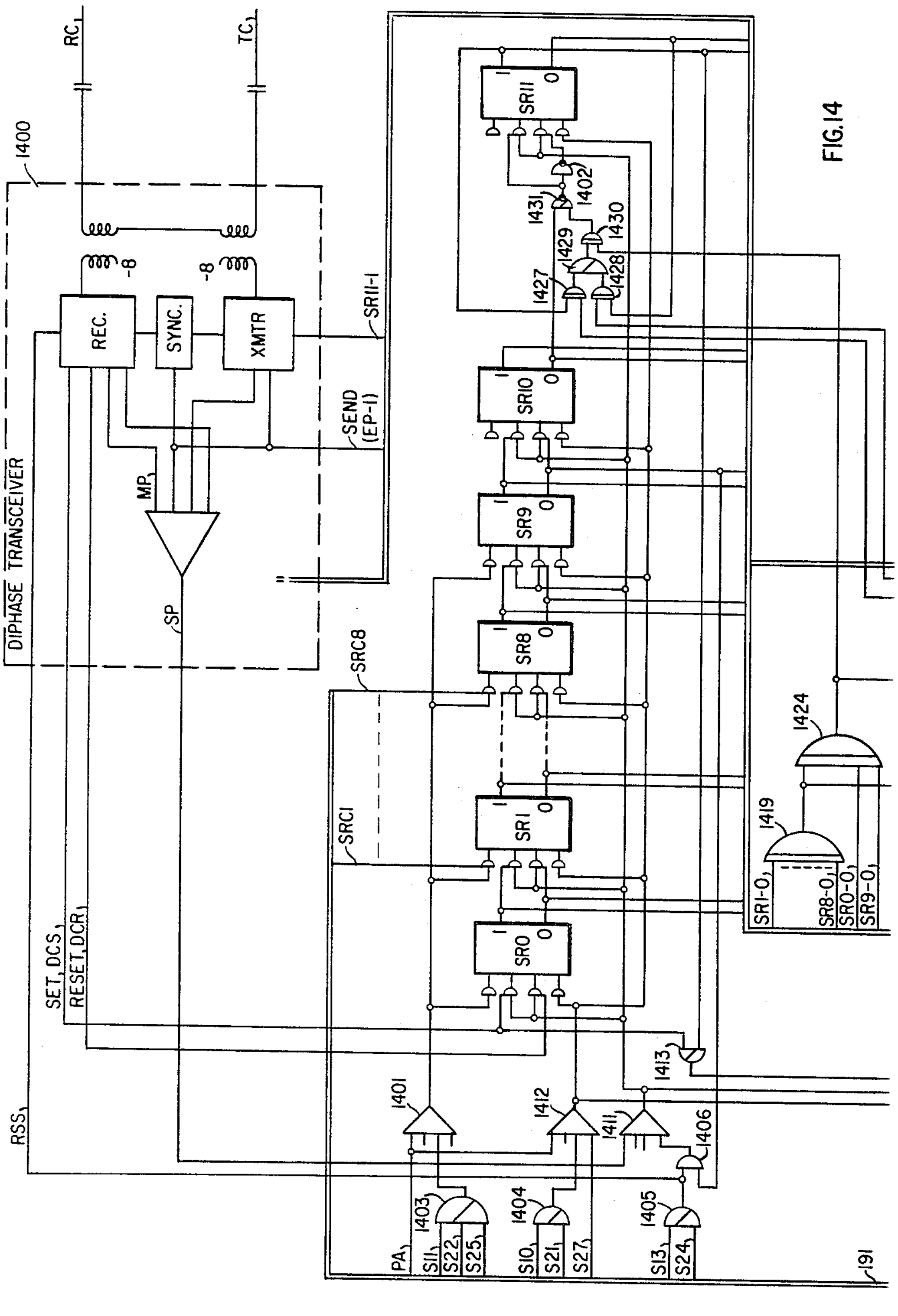
Figure 15:
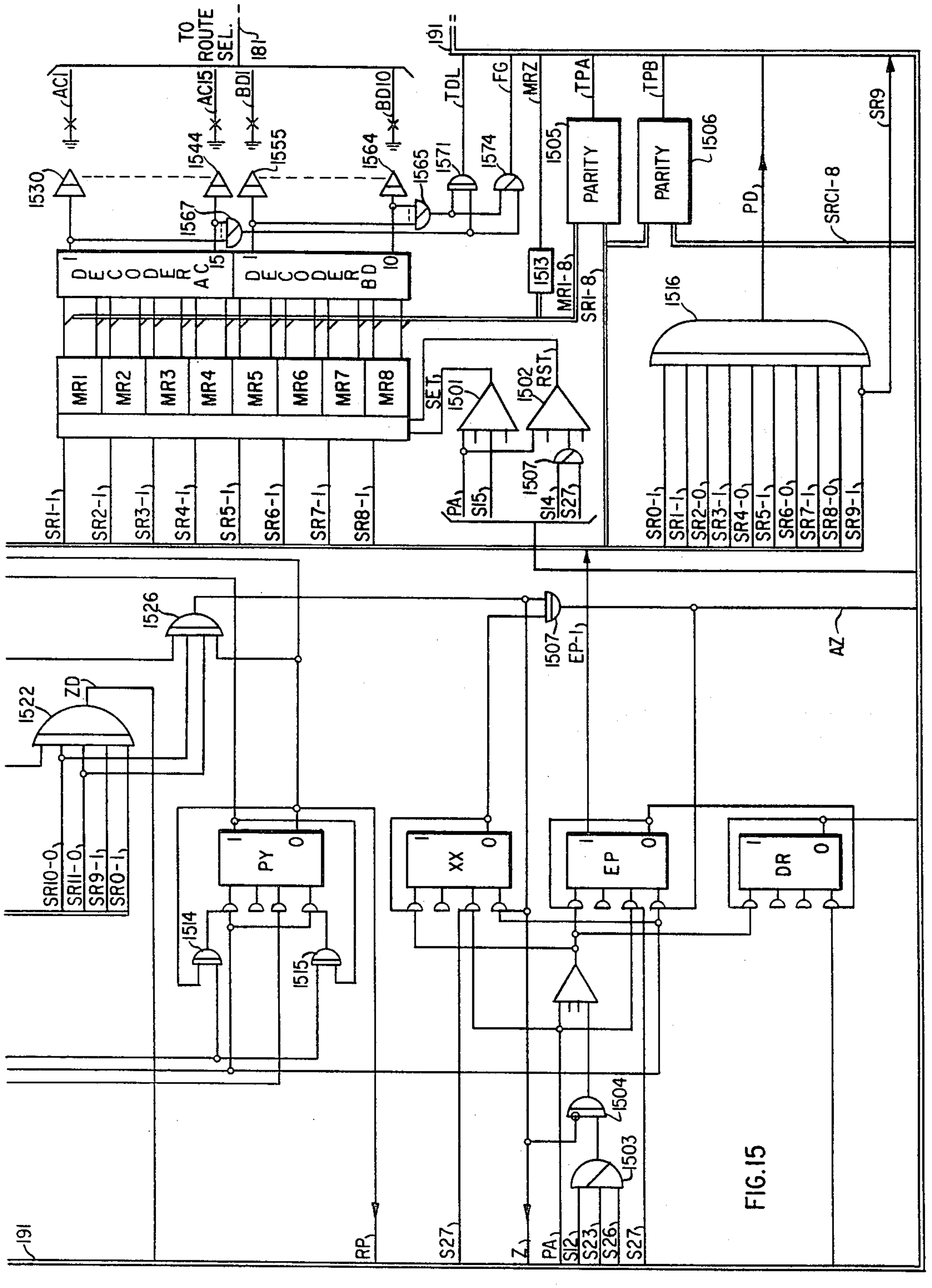
Figure 16:
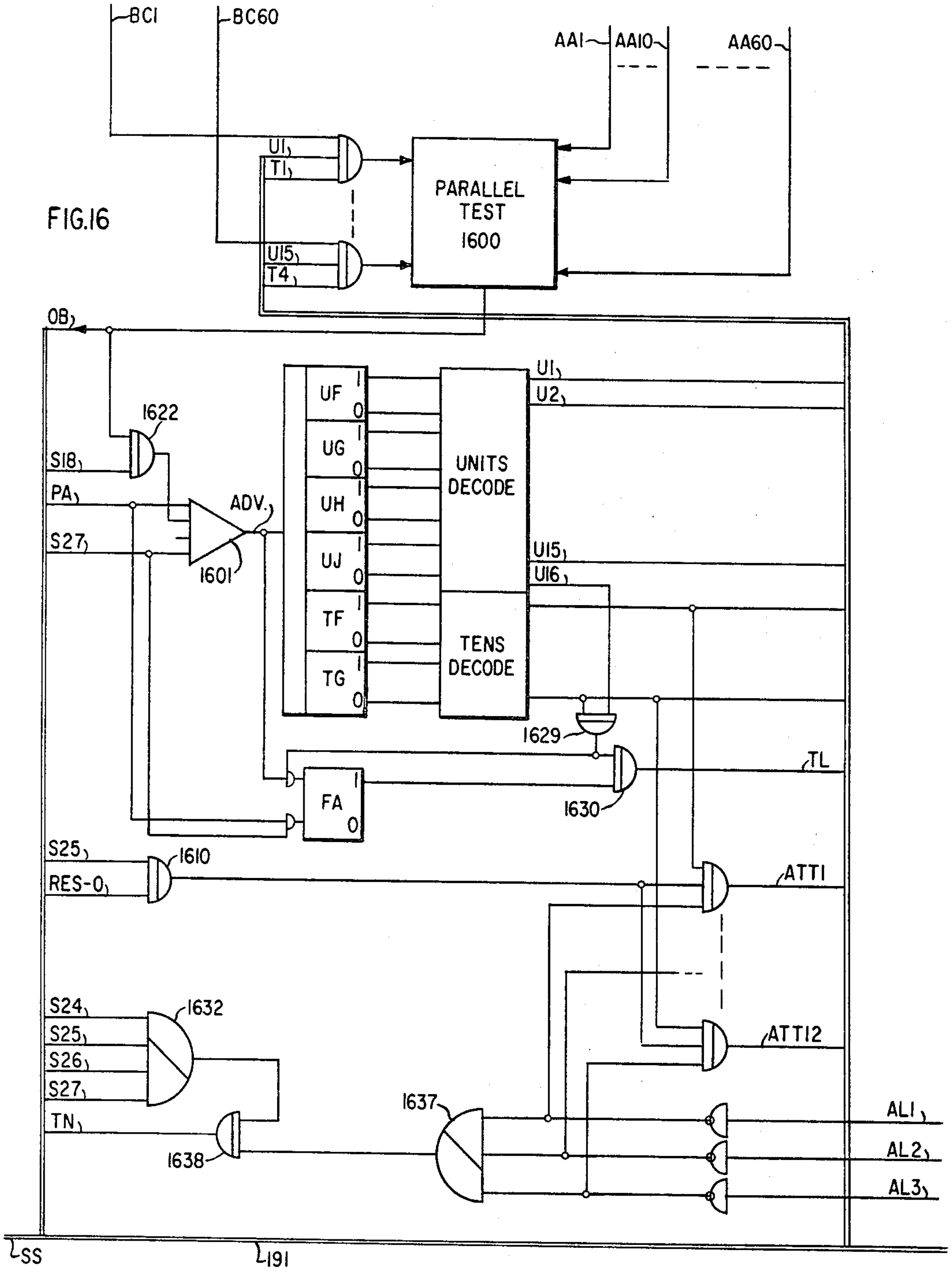
Figure 17:
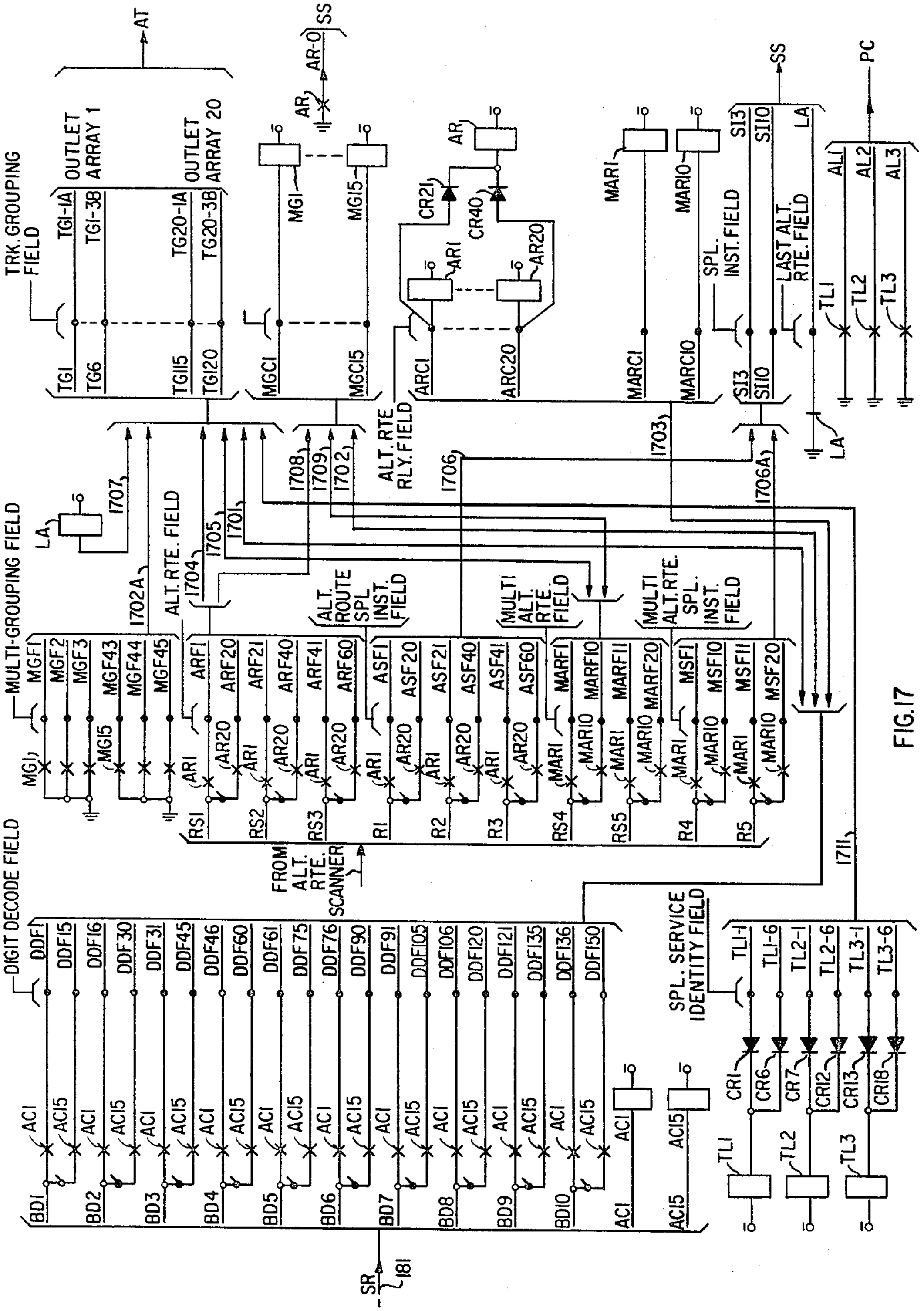
Figure 18:
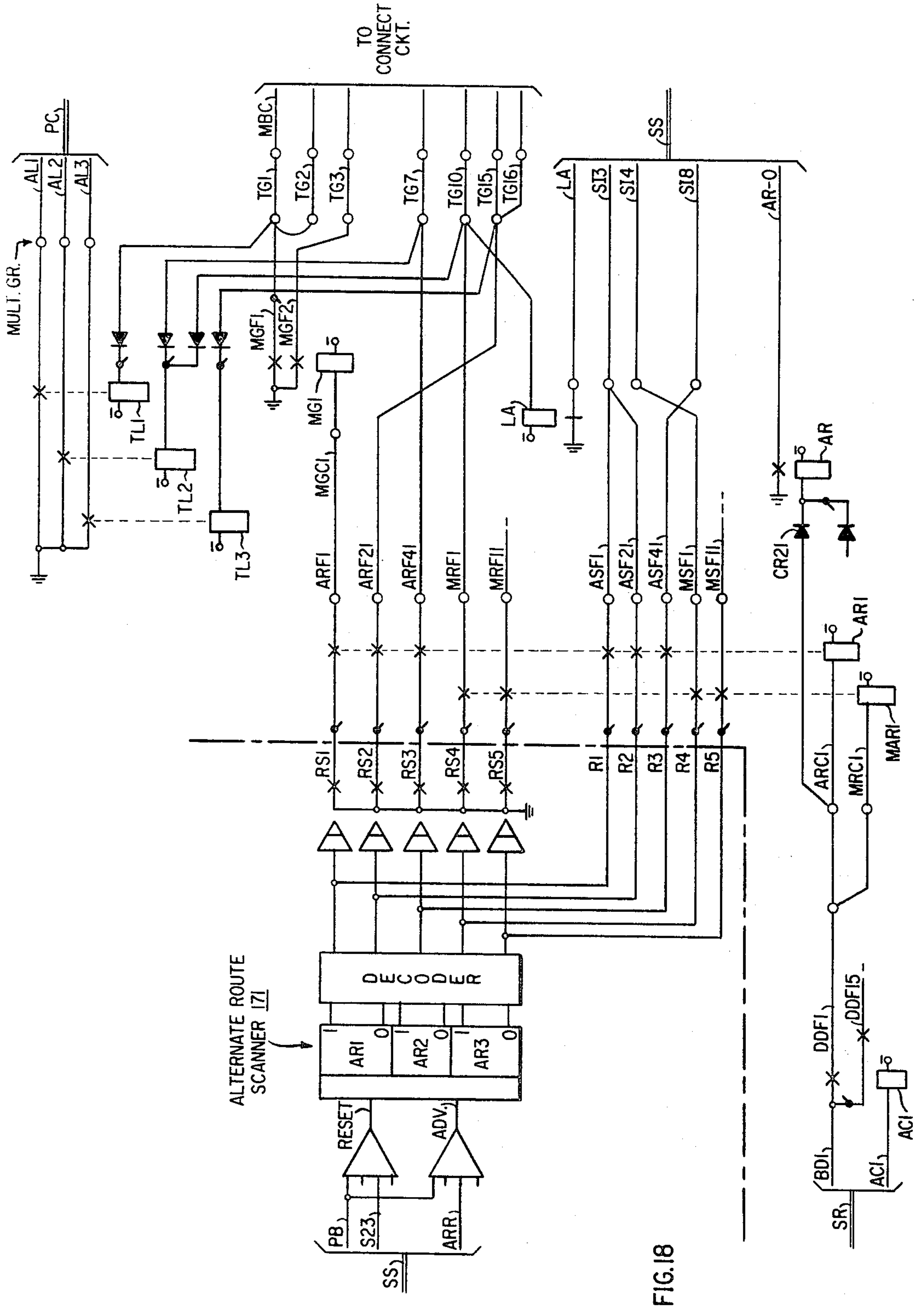
Figure 25:
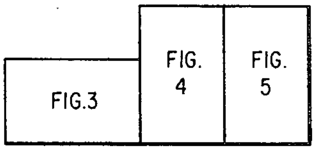
Figure 26:
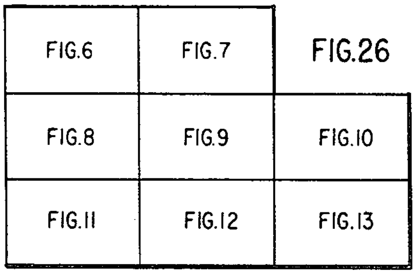
Figure 27:
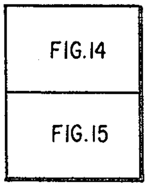
Figure 27:
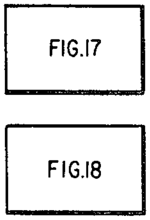
Figure 28:
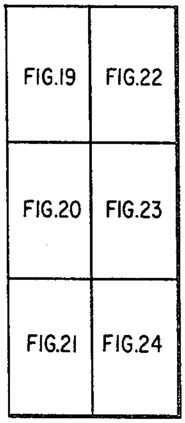

FIGS. 3, 4 and 5 when arranged as shown in FIG. 25 comprise a call-thru diagram of the telephone exchange of FIG. 2;

FIGS. 6 to 13 inclusive when arranged as shown in FIG. 26 comprise a functional block and schematic diagram of the group selector and marker of FIG. 1;

FIGS. 14 and 15 when arranged as shown in FIG. 27 comprise a functional block diagram of the send-receive circuit of the group selector marker;

FIG. 16 is a functional block diagram of the outlet scanner and selector portion of the path control circuit of the marker;

FIG. 17 is a diagram of the level translator and selector of the route selector portion of the marker;

FIG. 18 comprises a functional block diagram of the alternate route scanner, and a typical example of jumper connections in the level translator and selector of FIG. 17; and FIGS. 19 to 24 inclusive when arranged as shown in FIG. 28 comprise a functional block diagram of the sequence and supervisory circuits of the marker.

The features of the invention are embodied in a group selector GS and its marker GSM shown by the functional block diagram of FIG. 1, which supplies the intermediate switching functions of a communication switching system shown by the block diagram of FIG. 2. A call-thru diagram of the system is shown in FIGS. 3, 4 and 5.

As shown in FIG. 2, the system consists of the line group LG, group selector GS, register-sender group RSG, and the translator TR. There is also a trunk group TG which provides access from incoming trunks to the registers, and a control center CC which contains a special computer for operation analysis and recording, and program upgrading equipment.

All of the electronic equipment is furnished in duplicate; for instance, two line group markers A and B may serve up to ten line groups and two group selector markers A and B may serve up to ten group selectors. A minimum of two register-sender groups RSG will be equipped per office and the translator TR, including the magnetic drum 12 and logic circuitry, will always be furnished in pairs per 10,000 directory numbers.

Time division techniques are used in the register-sender group RSG and in the translator TR. The markers are designed on an electronic basis and semiconductor circuitry is employed throughout the system. A ferrite core memory 16 is used for temporary storage whereas the magnetic drum 12 is used for semipermanent storage.

The space division switching elements of the system consist of reed relay matrix assemblies. The cross-points are made up of reed capsules and having normally two windings. They are mounted on a two layer printed card and the entire assembly constitutes a switching matrix. In some cases the cards are wired together to form a single larger matrix. The system contains no conventional telephone relays, but similar functions are performed by reed relays. A reed relay assembly is essentially a cluster of magnetic reed elements controlled by coil windings and with or without a permanent magnet.

The electronic logic circuitry employs eight standard circuits as building blocks. These standard circuits include NOR gates, inverters, flip-flops, clocks, gated pulse amplifiers, parallel test circuit, parity circuit, and reed relay driver.

The "Communication Switching System" is disclosed in a copending U.S. patent application by K. K. Spellnes, Ser. No. 230,887 filed Oct. 16, 1962, now Patent No. 3,170,041.

During the setting up of a call a two-way communication path is provided between the sender and the switching group markers involved in terminating the call. In addition to receiving switching instructions, the marker may signal back to the sender certain information. A description of the sender and of the information interchanged between it and the markers is described in the copending application for a "Sender For Communication Switching System" by B. Sherstiuk, Ser. No. 280,053 filed May 13, 1963, now Patent No. 3,278,691. The method of signaling between the system groups is accomplished by a technique called diphase. This method employs a phase shift technique for serial sending and receiving of pulses, as described in the copending U.S. application for "Diphase Transmission System" by W. R. Wedmore, Ser. No. 352,912 filed Mar. 18, 1964, now Patent No. 3,349,330.

TRACING OF A LOCAL CALL

As an introduction to the system operation, a brief description of a typical local call as processed through the system is now presented. The block diagram of FIG. 2 may be followed for tracing the call.

When a subscriber lifts the handset, the line group marker LGM goes into action first by detecting the originating call mark, identifying the calling line, and selecting an idle register junctor such as RJ1 within the register-sender group RSG. A path is then temporarily established from the calling telephone to the register junctor by the A, B, C matrices, the originating junctor OJ, and the R matrix in the line group LG, and the subscriber receives dial tone from the register junctor RJ1. The dialed digits are stored temporarily via the common equipment 14 into the ferrite core memory 16, coded, and processing is continued by the common equipment 14 as these digits are passed to the translator TR, analyzed for type of incoming call, and instructions are selected from the drum memory 12 and returned to the register-sender RSG to guide further handling of the call. Upon receipt of the remaining digits, the translator TR returns switching instructions corresponding to the called number as stored in the drum memory 12. The instructions are transmitted from the register-sender RSG via one of the senders S1–S10 and the originating junctor OJ of the originating line group to the group selector GS. In the group selector GS, the instructions are analyzed by the marker GSM, an idle terminating junctor TJ in the terminating line group is located, and a path established to that line group via A, B and C matrices of the group selector GS. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered. On outgoing calls the group selector establishes the connection to an outlet to an outgoing trunk.

Since the system is a common control operation, the markers of the line group and group selector function only to serve the assigned portion of the call processing, then release to serve other calls. The register-sender RSG and the translator TR are functioning on a time division basis and therefore are processing several calls simultaneously. The temporary signaling and control path are released for further service while only the talking path is held through the switching matrices and junctors.

THE GROUP SELECTOR

Referring to FIG. 1, the intermediate switching functions of the system are performed by the group selector GS. Three stages of crosspoint switches are provided. The first switching stage 112, the A stage, contains 60 cards of 50 crosspoints, each arranged in a 5×10 matrix. This switching matrix is associated with the inlet circuit line and cut-off reed relays to the group selector. The second switching stage 114, the B stage, contains 60 cards of 60 crosspoints each in a 10×6 matrix. The third stage 116, the C stage, uses a basic arrangement of 60 crosspoints in a 6×10 matrix to provide 600 outlets. In addition, a second group 117 of 60 switches may be added to expand the outlet capability to 1200 in case of a very large central office. The group selector has 300 inlets 110 serving the originating junctors in the line groups and incoming trunks.

The outlets of the group selector are arranged as 120 arrays of ten outlets each. These arrays may be combined to accommodate trunk groups of any size.

The operation of the group selector is controlled by an electronic marker GSM. The marker has control of all crosspoints in the group selector and sets up calls on a one-at-a-time basis. The marker operates in response to selection digits received electronically in its send-receive circuit 180 from the register-sender group RSG. The holding time of the marker is approximately 100 milliseconds.

Because of the common control nature of the marker, and its high speed, it is possible to provide switching features that would otherwise require a large investment in the form of additional switching stages.

Alternate route selection is performed by the group selector marker. In selecting an alternate route, the marker will identify this trunk group as one that requires a change in the digits to be outpulsed or a change in the type of outpulsing, multi-frequency or dial pulse. In this case, the marker will send back instructions regarding digit changes or a command for the sender to change the type of pulsing. If no change is required, the marker can switch the call through to an alternate trunk without changing the sender's instructions.

Insertion junctors 130, shown in the system block diagram at the outlet of the group selector, are used for ticketing, add-on conference calls, coin-box completing, PPCS, annoyance calls, etc. These junctors may be inserted into connections on command from the program written on the magnetic drum.

The group selector marker is equipped to identify ticketing trunks and relay this identity to the register-sender group. This permits ticketer storage functions to be placed on the magnetic drum eliminating the need for storage facilities in the ticketing trunk.

Two group selector markers are always provided. Each may be associated with a maximum of five group selector units and is also capable of assuming the load of its companion marker.

The operation is controlled by the sequence and supervisory unit 190. In its idle state, the group selector marker is continuously scanning the group selector matrices for new calls. The register-sender group, via an originating junctor or incoming trunk, initiates a demand on a group selector by pulling the inlet line reed relay. When associated with a matrix, the marker actuates the inlet identifier 162, and upon finding the inlet demanding service stops its scanning at that point and connects its send-receive circuit 180 to the demanding inlet. The routing digits are sent in high speed code from the sender into the send-receive circuit 180. During this same time, the marker operates connect reed relays to link selector 163 to determine the link availability from the demanding inlet in the A stage toward the outlets through the B and C stages. Two routing digits are received by the send-receive circuit 180 in the marker and extended to the level translator and selector 172 to cause connect reed relays to gate idle test leads of the selected trunk group into the outlet scanning unit 164. Within this scanner the link availability is combined with the outlet idle leads such that an idle outlet can appear idle to the scanner only if an appropriate idle link to that inlet exists.

If the trunk scanner finds an idle outlet, it actuates the matrix pull unit 173 to pull the proper group selector crosspoints, checks to make sure that the selected outlet becomes busy indicating seizure through the group selector crosspoints, and clears its circuits.

If an idle outlet is not found, the marker checks its alternate routing equipment 171 for an alternate. An alternate route causes new connect reed relays to operate to the outlet selector portion and a new outlet scanning operation takes place for the alternate.

SWITCH-THRU DIAGRAM

FIGS. 3, 4 and 5 comprise a switch-thru diagram which shows a typical connection from a local calling party to either a local called party or to an outgoing trunk. The diagram particularly shows the signaling paths between the register-sender group and the other sections of the system.

LOCAL CALL

The operation of the telephone system will now be described, assuming that the local subscriber at station 301 initiates a call to another local subscriber. Upon removal of the handset by the calling subscriber the line group marker identifies the line and searches for an idle register junctor, and after finding, for example, local register junctor 401 idle, the line group marker finds and establishes a path shown here as being via crosspoints 312, 314, 316, an originating junctor 320 and a crosspoint 318 of the R matrix. The marker supplies the equipment location number of the calling line and other information such as class of service to a shift register in the send-receive circuit 380. A signal is extended through a relay tree and via lead BY to the register junctor as a call signal to the register which responds by a potential over the same lead BY. The send-receive circuit 380 then uses its diphase equipment to transmit the information from the shift register via the relay tree and leads TR and RR to the register junctor and thence via leads TDM and RDM to the register receiver 430 which includes a shift register and diphase receiver. In the register this line number identification information is transferred into the ferrite core memory 16 (FIG. 2). After sending the line number identification to the register and establishing the connection thereto, the line group marker releases.

The register junctor 401 connects a relay A to the subscriber's line loop. This relay has a contact for repeating pulses to time division multiplexing equipment (not shown) in the register. The subcriber receives dial tone and proceeds to dial. The register operating on a time division multiplex basis records the dialed digits in the ferrite core memory 16.

In accordance with the program provided in the register, a translator is requested after a certain number of dialed digits. The register transceiver 490 is taken into use and the dialed digits loaded into the shift register thereof. A signal is extended over a service request conductor which causes a relay 591 in the translator to operate when it is available, thereby connecting its transceiver 512 to the register transceiver 490. The digits are then transmitted from the shift register of the register transceiver 490 via the diphase equipment to the shift register of the translator transceiver 512. The translator makes a translation and loads the translated information into its shift register and returns this information via the diphase equipment to the shift register in the register receiver 490. The register then takes this information from the transceiver shift register and places it in the memory 16.

When the register has received translated information from the translator sufficient to indicate the route for terminating the call, the sender assigner 483 is called in to seize an idler sender and establish a connection via the register sender matrix 581 to the register junctor 401, and also records the identity of the sender in sender controller 431 in the register. The sender controller connects to the sender via a time division multiplex multiconductor line 432. During the time slot of the register, switching digits are taken from the memory 16, and via the sender controller 431 and line 432 are supplied to equipment, not shown, of the sender which includes eight storage flip-flops for two digits of four bits each.

Ground potential from contacts of relay CS, via lead EC, through the register junctor 401 and the originating junctor 320 causes operation of line relay L of the selector inlet. The selector marker when it recognizes this request for a call, causes all line relays of the group to release except the one associated with this call. The send-receive circuit 180 of the marker is now connected via contacts of relay L, and the tip and ring conductors of the line, via the originating junctor, the R matrix to leads TS and RS, the register junctor, the RS matrix 581 and through break contacts of relay TR to the diphase unit 580 of the sender.

The selector marker sequence circuit supplies a "connect" digit (1010 1010) into the shift register of send-receive circuit 180, which is then sent via the diphase equipment to the sender transceiver 500. Two switching digits are taken from the register memory 16 and supplied via sender controller 431 and a time division multiplex line 432 to the sender, where they are loaded into the transceiver 500 and transmitted to the selector send-receive circuit 180.

The selector marker uses the two digits received to identify the level and to select and establish a path for example via crosspoints 412, 414, and 416 to a terminating junctor 530 of a line group serving the called party. The selector send-receive circuit 180 then transmits a "clear" instruction (0000 0000) to the sender, and the selector marker releases.

The information is received in the sender via diphase transceiver 500, which is then conditioned to receive from the called line group marker send-receive circuit 580.

The line group marker is seized by the call signal comprising a ground signal on the EC conductor. The send-receive circuit 580 by its diphase equipment transmits a "connect" signal which is received in the sender via its diphase transceiver 500.

The next two switching digits from the register are loaded into the transceiver and transmitted to the line group marker send-receive circuit 580.

The line group send-receive circuit 580 returns the signal "incomplete." In response thereto, the sender loads another two switching digits from the register into its transceiver 500. The two digits are transmitted via the diphase equipment to the line group marker send-receive circuit 580.

The line group marker now has sufficient switching information to identify the called line, which we will assume to be at station 501.

The line group marker now makes a busy test of the called line, and if idle, scans for an idle path thereto. In accordance with the conditions found by the marker, it may return any one of several signals via the diphase equipment to the sender, such as "line idle," "line busy," "resend," or "trunk busy." In this case the line is found to be idle so the "line idle" signal is returned to the sender.

The line group marker establishes a connection via crosspoints 532, 534, 514 and 512 in matrices E, D, B and A respectively. The party digit which is included in the switching instructions received is supplied via leads TA, TB, TC, and TD and contacts of relay TJS to the terminating junctor to designate the ringing signal.

A ringing signal is transmitted to the called line and a ringback tone is transmitted to the calling line from the terminating junctor. The call from now on is supervised by the terminating junctor.

In the sender the line idle signal has been received into the transceiver, and initiates release of the sender and register.

OUTGOING CALL

The operation for an outgoing call is the same as that for a local call down to the point at which the sender transmits two switching digits to the group selector send-receive circuit 180. The selector may establish a connection via a primary route, or if it finds that it is unable to do this it may itself select an alternate route and establish the connection accordingly. Also the outgoing trunk selected may or may not require ticketing. Assuming that the outlet selected is via crosspoint 417 the selector marker operates crosspoints 413, 415 and 417 in series over their lower windings. The outgoing trunk circuit applies ground to lead C to hold these three crosspoints over their upper windings in series with the cutoff relay CO.

If the outlet is via the primary route and there is no ticketing information the selector send-receive circuit 180 will merely return the "clear" signal which will be received at the sender transceiver 512 to initiate outpulsing.

If the selector was unable to complete the connection via the primary route and has selected an outlet via an alternate route, the send-receive circuit 180 returns an alternate route digit in the first position of the shift register. The alternate route digit is received via the sender transceiver 512 and transmitted via the multiplex line 432 and sender controller 431 for storage in the register memory 16.

If the connection is via a trunk which requires ticketing, the group selector identity will appear in the second position of the shift register. In this case also the information is received via the sender transceiver 512 and supplied via line 432 and sender controller 431 to the register memory. There may or may not also be an alternate route instruction digit, and if there is it is also supplied in the first shift register position as described above. A signal in which the eight information bits are all zeros is returned from the transceiver 512 to the selector send-receive circuit 180 as an acknowledgment signal. The selector then loads two additional ticketing digits identifying the particular selector outlet into its send-receive circuit 180 and transmits them to the sender transceiver 512. These digits are also supplied via line 432 and controller 431 to the register ferrite core memory 16.

Note that on a ticketing call the selector transceiver transmits to the sender diphase transceiver 512 three times, the first being the connect signal, the second constituting the alternate route and first ticketing digit, and the last being two additional ticketing digits.

After the completion of signaling between the selector send-receive circuit 180 and the sender diphase transceiver 500, the sender switches to an outpulsing mode and operates relay TR to disconnect the transceiver 500 and connect the line to the outpulsing equipment. The outpulsing may be either dial pulsing or multifrequency pulsing. If dial pulsing is used the dial pulse transmitter 502 via the gate 591 and a relay driver 593 operates a contact set which is in the loop from the sender to the outgoing trunk. If multifrequency outpulsing is used the MF transmitter 503 supplies the signals via a transformer to the loop to the outgoing trunk.

Assume in this case that the outgoing trunk is arranged for dial pulsing via a loop to the distant office. As the digits are received from the register memory 16 via the sender controller 431 and line 432 they are used to actuate equipment in the dial pulse transmitter 502 to generate the pulses and via the break contact set of relay driver 593 and the loop via the T and R conductors through the register junctor 401, the originating junctor 320, the inlet circuit 410 of the selector, the established path through the matrices to the outgoing trunk controls the battery feed relay BF. The pulses are repeated via contacts of relay BF on the other side of the repeat coil to transmit the pulses via the loop to the distant office. After all of the digits have been sent the sender initiates release of itself and the register.

LOGIC SYMBOLISM

Electronic logic circuits used in the system described herein employ as standard building blocks NOR gates, inverters, flip-flops, and gated pulse amplifiers among others.

Each of the flip-flops includes two transistors in a bistable circuit configuration. Each flip-flop is provided with four coincidence gates for inputs, either one of the first two being used to set the flip-flop, and either one of the other two being used to reset the flip-flop. Each coincidence gate has an A.C. input and a D.C. input and requires coincidence of these two inputs to effect a change of state of the flip-flop. The A.C. inputs are usually supplied with a train of recurring pulses from a clock source via a gated pulse amplifier. Each input coincidence gate of a flip-flop is arranged with a priming time so that the D.C. input must be present for this period of time before the A.C. input will be effective. This priming time along with the switching and transmission delays in the circuits provides an arrangement in which a change of state of a flip-flop produced by one A.C. input pulse is not effective at the D.C. inputs of the same or other flip-flops to produce another change of state until receipt of the next clock pulse.

Gated pulse amplifiers are transistor circuits having a direct coupled gating input arrangement and a capacitively coupled trigger pulse input terminal. When the two inputs coincide an output pulse is produced. The direct coupled gating is controlled via three input terminals and is effective when the first two of these inputs are true in coincidence, or the other input is true. Thus each gated pulse amplifier has four inputs and are always shown such that the upper input is the pulse input, the next two inputs are direct coupled coincidence inputs, and the last is a single direct coupled input. The direct coupled inputs are so arranged that if one of the coincidence control inputs is not used the other is effective when true and not effective when false, and if the single direct coupled input is not used it is not effective.

The logical gates are implemented with NOR gates, each of which is a one transistor logical element whose output can either be considered an AND function of the negation of its inputs, or it can be considered as an OR function of its inputs followed by an inversion. Therefore, the AND gates and the OR gate shown throughout the system are implemented with NOR gates. The electronic units are shown in the drawings as having any number of input and output loads, but in actual implementation these would be limited by loading requirements well known in the art.

A typical schematic diagram of these circuit elements is illustrated in FIG. 51 of U.S. application Ser. No. 304,892 filed Aug. 27, 1963 by W. R. Wedmore, now Patent No. 3,293,368.

Except for the clock pulses used for triggering at the A.C. inputs of the flip-flops and gated pulse amplifiers, the logic circuits in the system are direct coupled, that is, signals are represented by steady-state voltages. Two levels are employed. The first level is usually −8 volts, although other negative values may be used, and represents the binary 1, true, on or active condition. The second level, ground potential, represents the binary 0, false, off or inactive condition. The flip-flops are used as registers with double-rail output signals to drive the logic circuits. A double-rail output is one in which both the logical "1" and "0" conditions are represented by active signals on separate leads. Only one of the two leads, however, has an active signal at any time. In the actual implementation most of the flip-flops and gate circuits are arranged such that the negative bias potential is provided at the input terminals of the gates and the D.C. inputs of the flip-flops, and this serves as the bias potential for the outputs of the preceding circuits. For the false condition, the flip-flops and gates provide a low resistance path to ground via a saturated transistor, and this ground potential is thereby applied at the inputs of the succeeding circuits.

In describing the logical operations performed by the circuits, Boolean algebra equations are used. In this notation the addition symbol signifies OR, the multiplication symbol, expressed or implied, signifies AND, and overlining signifies the inverted condition.

For convenience in the drawing, relays are shown having a large number of contacts although in the physical embodiment of this system the reed relay assemblies have been limited to ten contacts, and additional contacts are obtained by using parallel and slave connected reed relays.

GROUP SELECTOR AND MARKER.—DETAILED DESCRIPTION

Figure 6:
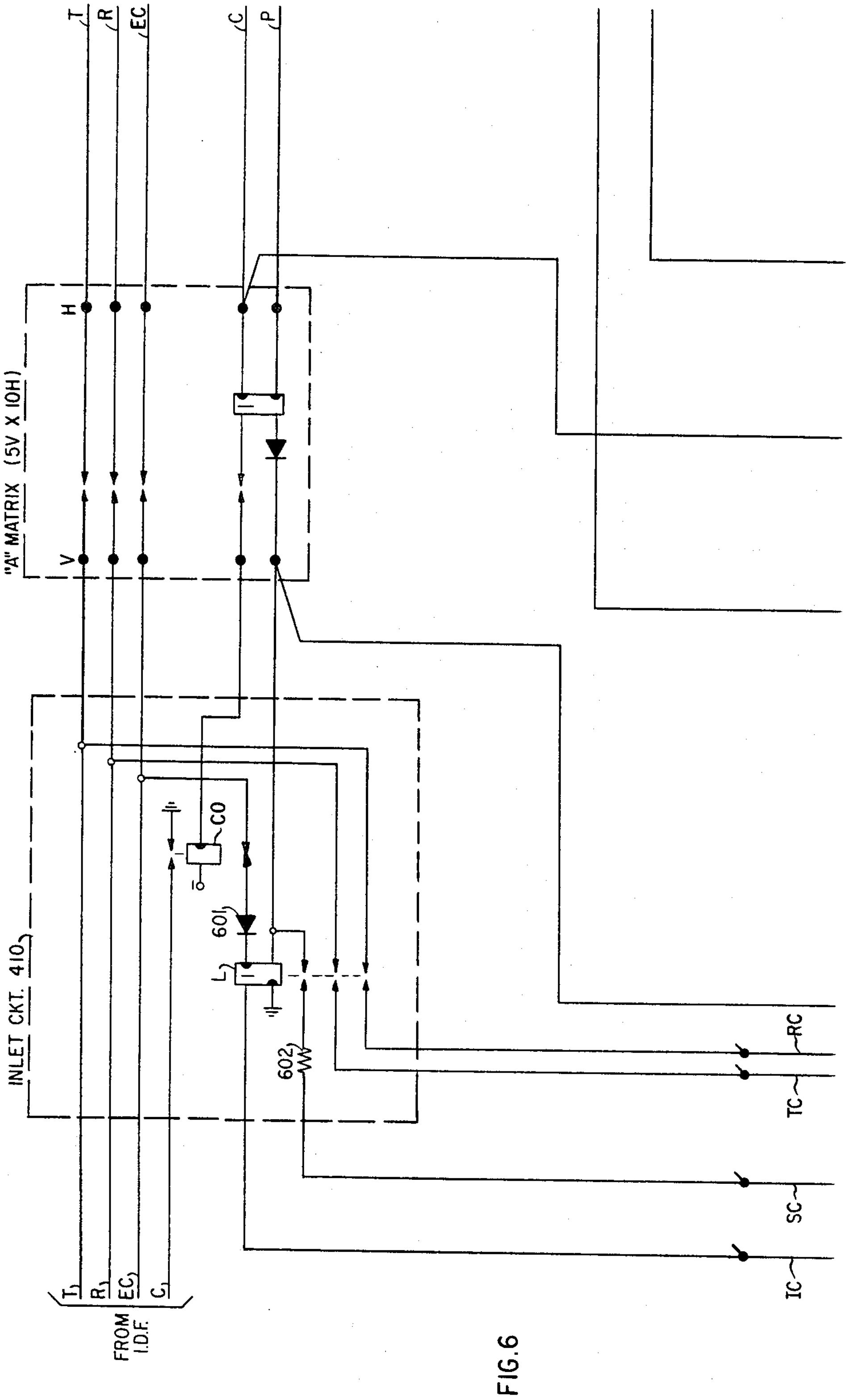
Figure 7:
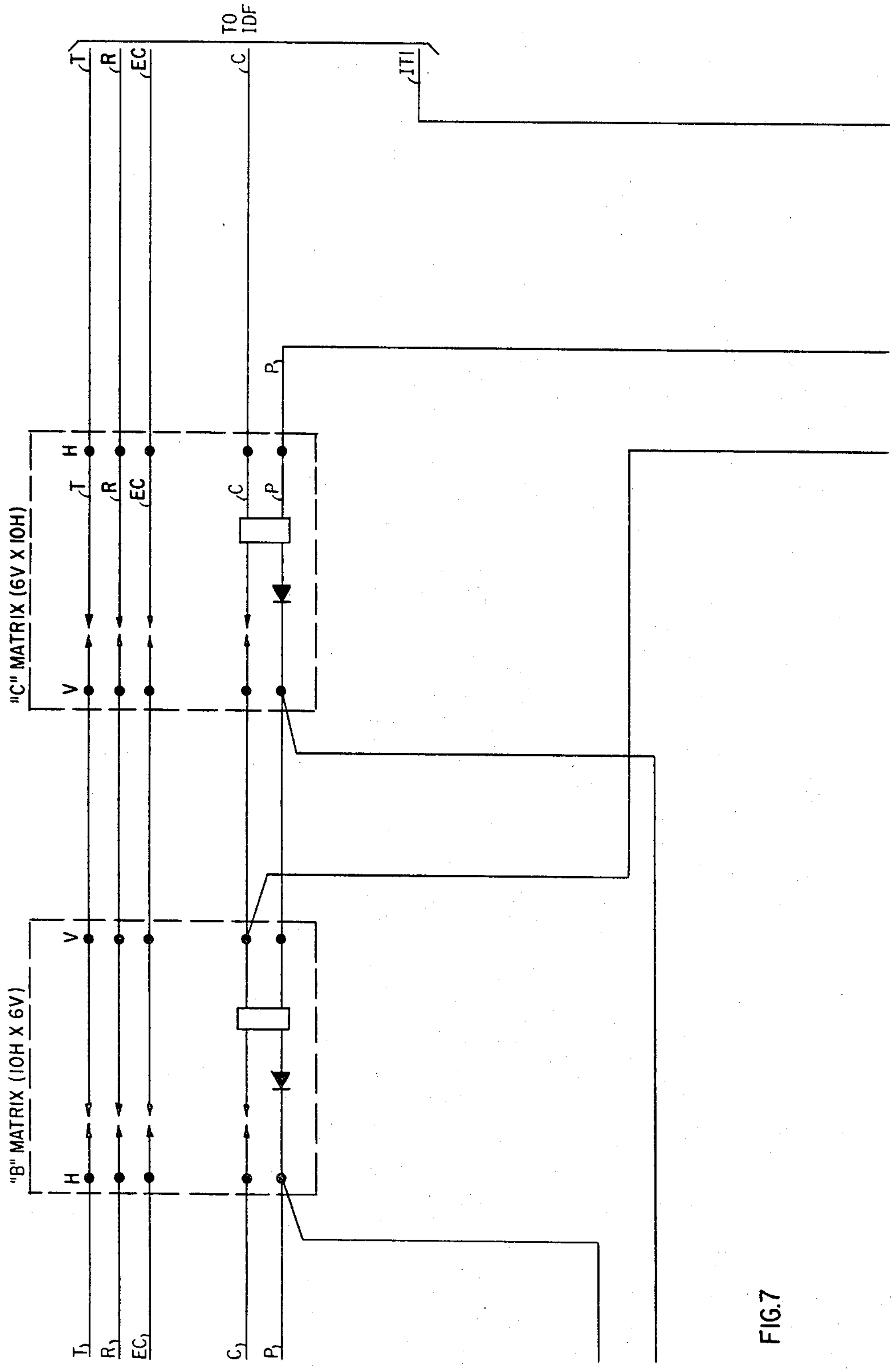
Figure 8:
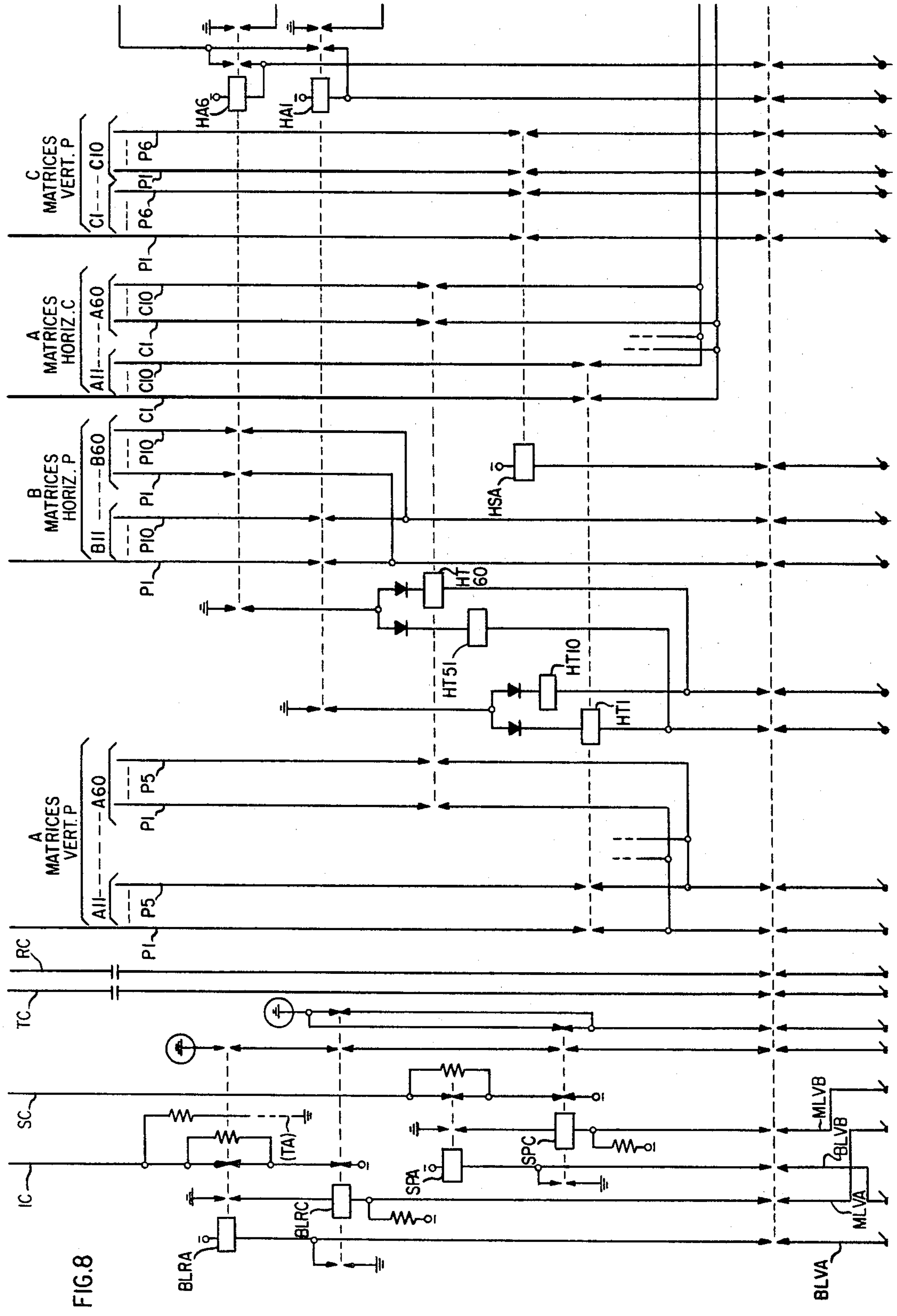
Figure 9:
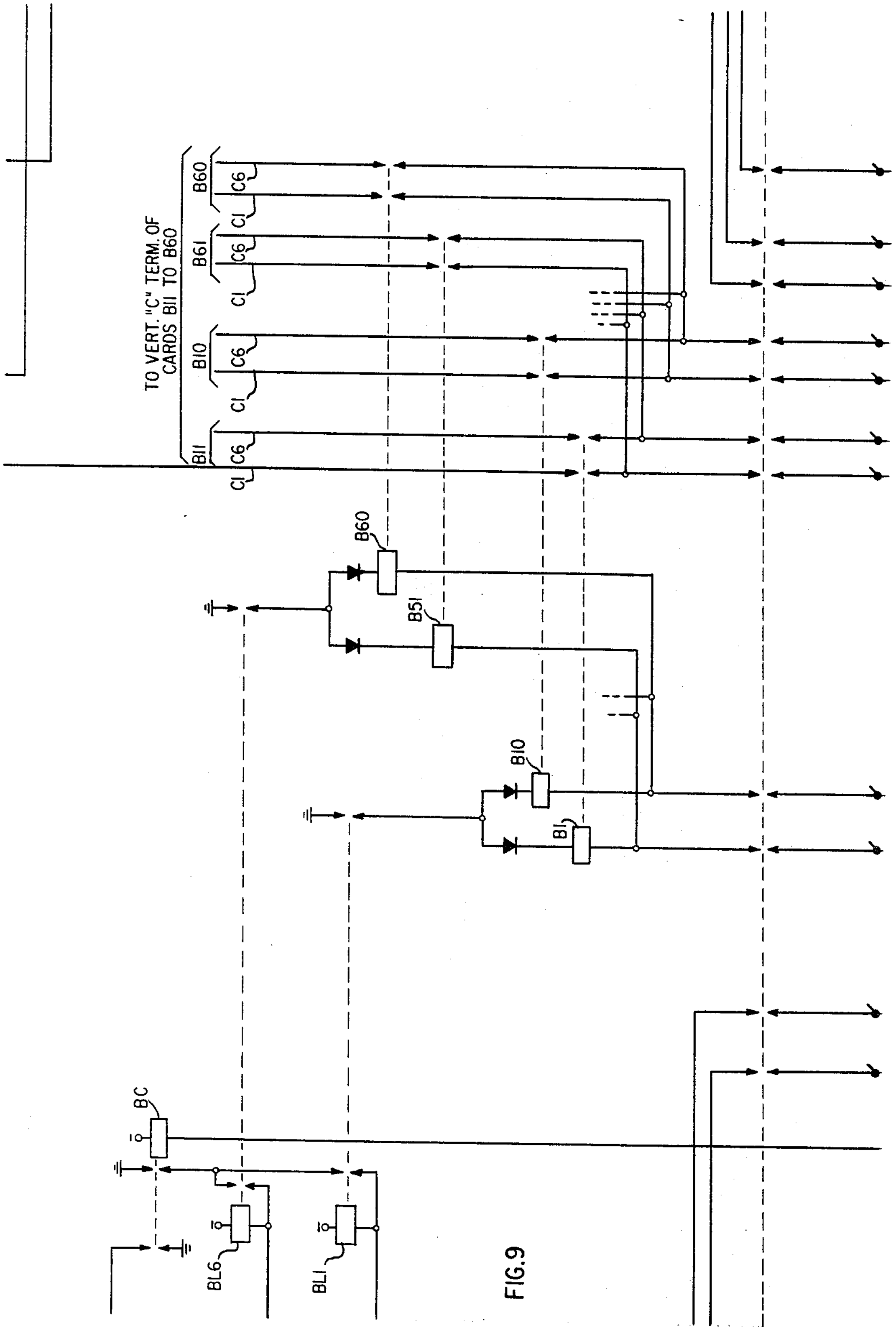
Figure 10:
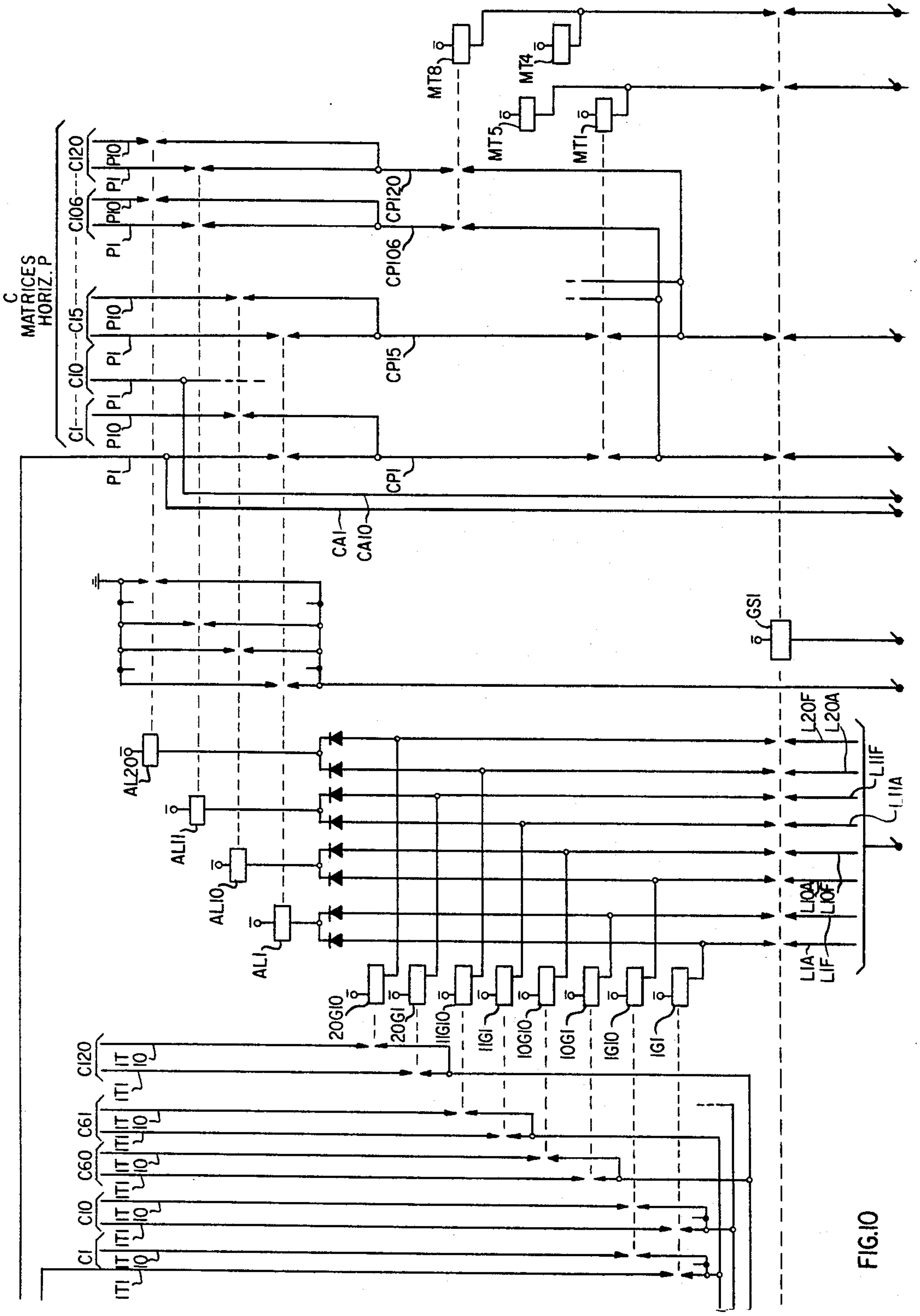
Figure 11:
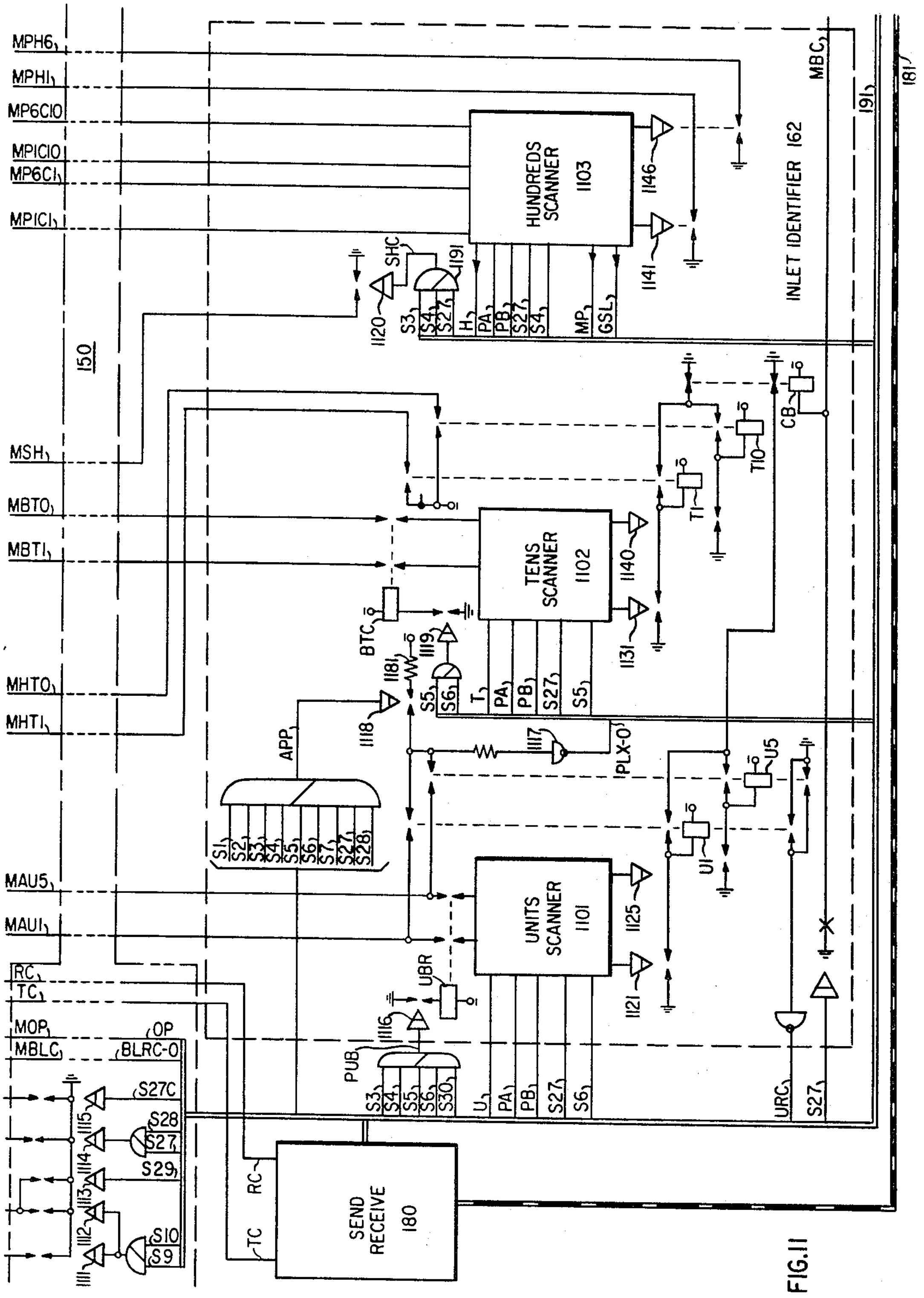
Figure 12:
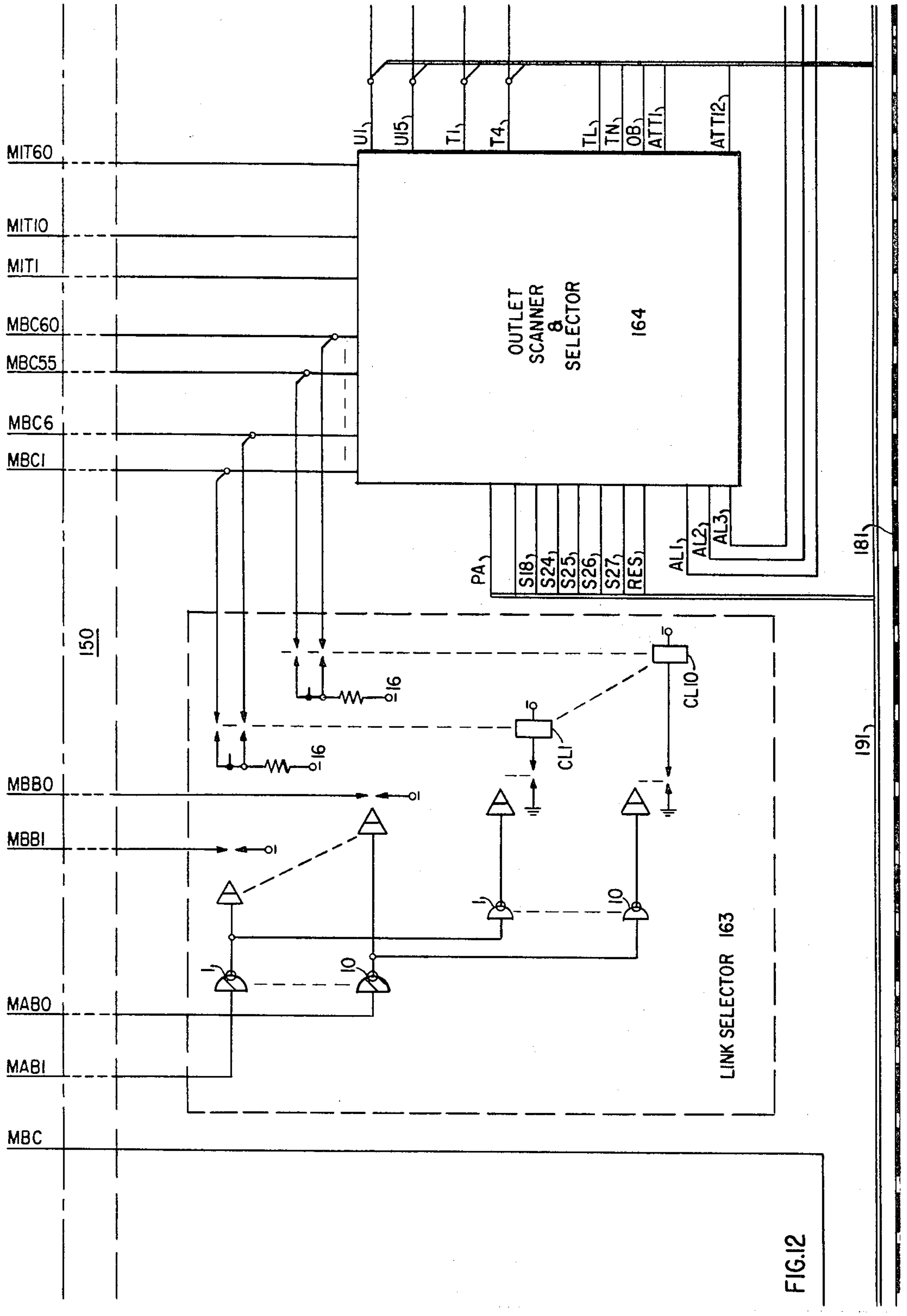
Figure 13:
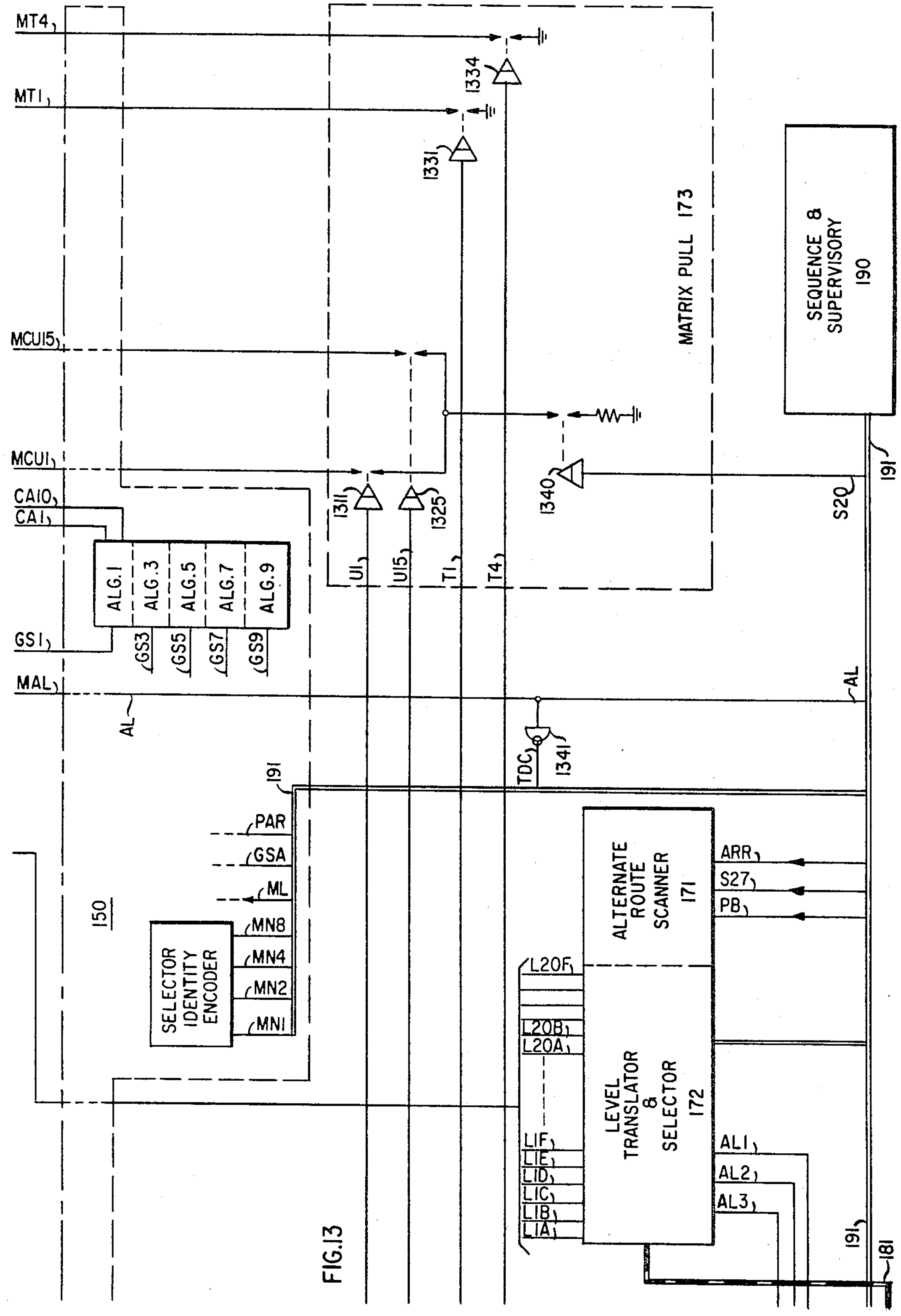

The group selector and marker shown in block diagram in FIG. 1, is shown in more detail in FIGS. 6–13. The group selector inlet circuit and switching matrices are shown in FIGS. 6 and 7; the group selector connect circuit 140 is shown in FIGS. 8–10, and the marker 400 is shown in FIGS. 11–13. FIG. 26 shows how FIGS. 6–13 are arranged.

The inlet circuit 410 includes a line relay L having two windings and three make contacts; and a cutoff relay CO having a set of break contacts and a set of make contacts. The circuit is seized by ground on lead EC which through the break contacts of relay CO, diode 601, and the upper winding of relay L extends via lead IC to battery potential in the connect circuit. Negative battery potential from the connect circuit on lead SC through resistor 602 supplies a marking potential on the P lead to indicate a service request. The switching network comprises three stages A, B, and C, of which one crosspoint in each is shown in FIGS. 6 and 7. These matrices are similar to those in the line group except that an additional lead EC is provided in the links with the corresponding additional contact in each crosspoint. The inlet identifier 162 shown in FIG. 11, along with associated connect circuits in FIG. 8 is similar to the line identifier arrangement in the line group marker, which is claimed in the copending U.S. patent application Ser. No. 231,425 filed Oct. 18, 1962 by L. Bruglemans, now Patent 3,211,837, for a Line Identifier Arrangement for a Communication Switching System. One P conductor from each of two C matrices, C1 and C10 are connected as shown in FIGS. 10 and 13 to the allotter which in response to the service request causes the operation of relay GS1 and locks out other line groups. Then the P conductor from the input (vertical) side of the C matrices C1 and C10 are connected through contacts of relay HSA and relay GS1 to the hundreds scanner 1103, which operates one of the relay drivers 1141–1146 to identify the hundreds group. This causes operation of one of the relays HA1–HA6, and one of the relays BL1–BL6. These relays lock to ground through contacts of relay BC. The P conductor from the input (horizontal) P conductor of the B matrices are then connected through contacts of the operated one of the relays HA1–HA6, and contacts of relay GS1 to the tens scanner 1102, which causes operation of one of the relay drivers 1131–1140. This causes operation of the corresponding one of the relays T1–T10 and in conjunction with the hundreds identify one of the sixty relays HT1–HT60. The P conductors from the inputs (verticals) of the A matrices are then connected through contacts of the operated one of the relays HT1–HT60, and through contacts of relay GS1, and in FIG. 11 through contacts of relay UBR to the units scanner 1101, which in scanning operates one of the relay drivers 1121–1125, and the corresponding one of the relays U1–U5.

The apparatus including relay drivers 1111–1115 in FIG. 11, and the relays BLRA, BLRC, SPA, and SPC in FIG. 8, provides a means to release all line relays; except the one which was identified and has battery potential through resistor 1181 applied to its P conductor.

The tip and ring conductors are connected through contacts of relay L to conductors TC and RC and thence through contacts of relay GS1 to the send-receive circuit 180. The switching instructions then can be received and supplied to the various selecting units of the marker. The C conductors of the AB links, from the horizontal terminals of the A matrices are connected in FIG. 8 through contacts of the operated one of the relays HT1–HT60 and in FIG. 9 contacts of relay GS1 to the link selector 163 in FIG. 12. The C conductors of the BC links from the vertical terminals of the B matrices are taken in FIG. 9 through contacts of the operated one of the relays B1–B60, and through contacts of relay GS1 to the outlet scanner and selector 164 in FIG. 12. Thus sixty leads MBC1–MBC60 are connected into the outlet scanner and selector 164, to indicate the availability of paths in the switching network. Negative 16 volts through resistors and contacts of operated ones of relays CL1–CL10 busy out BC links in paths to busy AB links.

The level translator and selector 172, and alternate route scanner 171, along with the outlet scanner and selector 164 and other circuits of the group selector marker and connect circuits enables the selection, seizure, and/or alternate routing of the switching outlets of the group selector matrix.

The alternate route scanner 171 uses coincidence gating to provide both electronic and relay signals when the selected trunk group requires an alternate route-special instruction.

The level translator and selector 172 selects a group of outlets, dependent upon the received switching digits from the send-receive circuit 180. It provides accessing to trunk groups of various sizes, up to a maximum of 60 trunks. It also provides for the sequential accessing of a primary route and a maximum of four alternate routes.

The matrix pull circuit 173 comprising fifteen units relay drivers 1311–1325, and four tens relay drivers 1331–1334, along with a relay driver 1340 seizes an outlet dependent on the trunk scan position and trunk level position.

The idle test leads from the selector outlets come through the IDF from idle test circuits in the terminating junctor, trunk, or other circuit associated with the outlet. In FIG. 10 there are 120 relays 1G1 to 20G10, and 20 relays AL1 to AL20 which are selectively operated in response to signals from the level translator selector 172. This provides a path for connecting the idle test leads through contacts of relays in the group 1G1 to 20G10 and then through contacts of relay GS1 to conductors M1T1–M1T60 to the outlet scanner and selector 172.

The matrix pull ground potential is connected through contacts of relay driver 1340, contacts of one of the relay drivers 1311–1325, contacts of relay GS1, contacts of one of the relays MT1–MT8, and contacts of one of the relays AL1–AL20 to the horizontal P conductor of the C matrix. The battery potential through resistor 1181 and contacts of relay driver circuits in FIG. 11 is supplied over one of the leads MAU1–MAU5, contacts of relay GS1, and contacts of one of the relays HT1–HT60 to the vertical P conductor of the A matrix. The connection can thereby be established, and is held by ground potential on the C conductor from the outlet through the three matrices in series and the cutoff relay CO to battery.

A second selector inlet circuit and switching network is shown in FIG. 42 of said Spellnes Patent 3,170,041. This is the same as a first selector circuit except that the inlet circuit includes an idle test circuit and an additional relay for returning ground over the C lead to the preceding switch train.

SEND-RECEIVE CIRCUIT

The send-receive circuit circuit 180 is shown by the functional block diagram of FIGS. 14 and 15, arranged with FIG. 14 above FIG. 15. FIG. 14 shows a diphase transceiver 1400 and a shift register comprising flip-flop SR0, SR1 to SR11. The transceiver is of the type described in the Wedmore Patent 3,349,330. In the shift register the flip-flops SR1 to SR8 inclusive are information bits organized into two digits of four bits each. The flip-flops SR0, SR9, SR10 and SR11 are prefix and suffix bits for transmission control. Briefly, for transmission the shift register is loaded by supplying an A.C. pulse via gated pulse amplifier 1401 to cause the D.C. information on the leads SRC1–SRC8 to be loaded respectively into the flip-flops SR1–SR8, and then the signal EP–1 becomes true and causes the transceiver to supply synchronizing pulses via a gated pulse amplifier to lead SP which via gated pulse amplifier 1411 supplies shift pulses to the shift register. The signals from the output of the last flip-flop SR11 via lead SR11–1 are supplied to modulate the transmitter of the transceiver and supply diphase signals over the two wire line TC, RC. For reception the signal on lead RSS to the receiver enables the transceiver so that when diphase signals are received on the two wire line TC, RC, synchronizing pulses are derived therefrom and supplied via the gated pulse amplifier to lead SP, and via gated pulse amplifier 1411 as shift pulses to the shift register. At the same time the demodulated signals are supplied via the leads DCS and DCR to inputs of the first flip-flop SR0 of the shift register.

In FIG. 15 a marker register comprising flip-flops MR1 to MR8 is used as a buffer register to provide temporary storage of received information. In response to a signal from gated pulse amplifier 1501 information from the shift register on leads SR1–1 to SR8–1 is transferred into the marker register. The information in flip-flops MR1–MR4 is decoded to operate one of fifteen relay drivers 1530 to 1544 which supplies a ground signal on one of the 15 leads AC1 to AC15. The output of flip-flops MR5–MR8 is decoded to operate one of ten relay drivers 1555 to 1564 to supply a ground signal on one of the ten leads BD1 to BD10. These two decoded output signals are supplied via line 181 to the digit decode field of the level translator and selector 172 in the group selector 170. A flip-flop PY is used in conjunction with the shift register flip-flop SR11 during transmission to produce a total serial transmission having an even number of "ones" in the transmission, and is used during reception to insure that there are an even number of "ones." There are also three additional control flip-flops XX, EP, and DR. A parity circuit 1505 is used to check parity between a received signal in the flip-flops SR1–8 and the information transferred to the marker register in flip-flops MR1–8 and to generate a signal TPA if parity is correct. The parity circuit 1506 is used to check parity between signals on the eight leads SRC1–8 and the information loaded into the shift register flip-flops SR1–8 and to generate a signal TPB if parity is correct.

PATH CONTROL.—OUTLET SCANNER AND SELECTOR

As shown in FIGS. 1 and 12 the path control portion of the marker includes an outlet scanner and selector 164; which is shown by a functional block diagram in FIG. 16. Selection is made by means of a parallel test circuit 1600, which may be of the type covered by the copending patent application Ser. No. 254,750 filed Jan. 29, 1963 for Communication Switching System and Outlet Testing Arrangement Therefor by W. B. Klees et al., now Patent No. 3,210,478. During the progress of establishing a connection through the group selector, after a calling inlet has been identified by the inlet identifier 162 and the outlet level has been selected by the level translator and selector 172, the connect circuits 140 have connected 60 BC links and a corresponding 60 outlets to the outlet selector 164. The function of the parallel test circuit 1600 is to test for a match between an available BC link and an available outlet and thereby select the outlet. The leads to the 60 outlets are shown connected to the right side of the parallel test circuit 1600, and the 60 BC links are shown connected through individual AND gates to the left side. A counter comprising flip-flops UF, UG, UH, UJ, TF, and TG is provided to scan the 60 paths one at a time. From the outputs of the counter a units decoder supplies fifteen signals U1–U15, and a tens decoder supplies four signals T1–T4. These signals are supplied to the BC link AND gates at the parallel test circuit, and also are supplied via cable 191 to the sequence and supervisory circuits. Each of the BC-link AND gates has one units input and one tens input so that as the counter operates only one of these AND gates is enabled at a time. If either the BC link or the outlet of a path corresponding to the counter position is busy the "outlet busy" signal OB from the parallel test circuit 1600 is true. This signal in coincidence with the sequence state signal S18 enables the gated pulse amplifier 1601 to drive the counter. When an available path is found the signal OB becomes false and thereby stops the counter in this position. As shown in FIGS. 12 and 13 the counter decoder outputs are connected to the matrix pull circuit 173. After the counter stops one of the units signals and one of the tens signal is true and operates the corresponding relay drivers in the matrix pull unit. Also as explained in said copending Klees et al. application, as soon as the parallel test circuit finds a match it immediately marks the outlet busy to prevent selection by other markers, and if two markers are testing an outlet in parallel at the same time only one of the markers can seize the outlet.

If all 60 of the paths are busy the scanner makes use of the units decoder output U16 and the tens output T4 in conjunction with AND gates 1629 and 1630 and a flip-flop FA to generate a signal TL to inform the sequence control that the last trunk has been tested.

If the trunk selected is a ticketing trunk a ground signal appears on one of the three leads AL1 to AL3 which is inverted and applied via OR gate 1637 and AND gate 1638 to generate a signal TN when the output from OR gate 1632 is true during states S24 to S27 inclusive. The inverted signals from the leads AL1 to AL3 also are applied along with the tens decoder output signals T1 to T4 to twelve decoding AND gates which are enabled by gate 1610 in response to a signal condition (S25 $\overline{\text{RES}}$), to supply an identification signal via one of the twelve leads ATT1 through ATT12.

ROUTE SELECTOR

As shown in FIGS. 1 and 13, the route selector comprises an alternate route scanner 171, a level translator and selector 172 and a matrix pull circuit 173. The level translator and selector 172 is shown in FIG. 17. This circuit receives the two switching digits from the send-receive circuit via cable 181 and further decodes them using fifteen relays AC1 to AC15 inclusive to provide a signal on one of a 150 leads at the digit decode field. The received switching digits comprise one AC digit and one BD digit and therefore one of the fifteen relays AC1 to AC15 is operated and this gates the ground signal on one of the leads BD1 to BD10 to one of fifteen leads in the digit decode field in accordance with which one of the relays is operated.

The signal from the digit decode field is used to select one or more trunk groups in the trunk grouping field, by means of a variety of jumper arrangements. As shown in FIGURES 10 and 13, each lead in the trunk grouping field operates one of the 120 relays 1G1 to 20G10 to connect the idle test leads to the outlet scanner and selector 164. The outlets are arranged in arrays. Referring to FIG. 1, the *Ca* stage has 600 outlets arranged in ten arrays of 60 outlets each, and if more outlets are needed a *Cb* stage is added having another 600 outlets arranged in an additional ten arrays of 60 outlets each. Each of these two outlet stages comprises 60 matrix cards of ten outlets each. An array comprises 60 outlets of corresponding outlets of all 60 matrices, for example outlet array 1 is the first outlet of matrix 1, the first outlet of matrix 2, etc. up to the first outlet of matrix 60. Each array is subdivided into six groups of 10 outlets each. For each switching digit output from the digit decode field of FIG. 17, access may be made to one to six trunk groups on the same outlet array, thereby providing for a maximum of 60 outlets. If more than 60 outlets are required or if the assigned trunks are not all on the same outlet array, the alternate route feature may be used.

Strapping 1701 is used from the digit decode field directly to the trunk grouping field to only one TG terminal of the trunk grouping field when ten or less trunks are on the assigned trunk group and there is no alternate route. For trunk groups of more than ten trunks and up to a maximum number of twenty, the strapping 1701 is provided from one digit decode field lead to two trunk grouping field leads.

Strapping 1702 from the digit decode field to multigroup relays, and strapping 1702A from the multigrouping field to the trunk grouping field is provided when: (a) the number of trunks exceeds twenty, and (b) all trunks are on the same outlet array, and (c) no alternate route is required. The multigrouping field is provided to avoid placing too heavy a load on the relay contacts supplying the digit decode field leads. Thus any particular output lead from the digit decode field may be connected to an individual one of the multigrouping relays MG1 to MG15 inclusive, and each of these relays has three contacts providing for connection via strapping 1702A to up to six of the TG leads in the trunk grouping field on a single outlet array.

Strapping 1703 is provided from the alternate route field when (a) an alternate route is required or (b) the assigned trunks are not all on the same outlet array. The alternate route relays AR1 to AR20 are provided to enable capabilities of a primary route and two alternate routes; and the multi-alternate route relays MAR1 to MAR10 are provided to increase the maximum alternate route capabilities by two additional routes. Thus, if there are one or two alternate routes in addition to the primary route a strap is connected from the digit decode field lead to one of the alternate route relays, and if there are three or four alternate routes a strap is connected from the digit decode field lead to both an alternate route and a multi-alternate route relay. Strapping 1704 is provided from the alternate route field and strapping 1705 from the multi-alternate route field to the trunk grouping field to select the trunk groups for the primary and each of the alternates. If for any one of the routes the number of trunks exceeds twenty strapping 1708 or 1709 from the alternate route or multi-alternate route field to the multigrouping field should be used, along with strapping 1702A from the multigrouping field to the trunk grouping field.

Strapping 1706 and 1706A is provided from the alternate route special instruction field and the multi-alternate route special instruction field to one of the eight leads SI1 to SI10 of the special instruction field to enable the group selector to communicate to the sender any of the eight special instructions which are developed from the strapping shown on this drawing between the AR field and the SI field. These special instructions indicate to the sender to outpulse to the distant office the called number dialed digits plus or minus switching digits received from the translator, and whether to use multifrequency (MF) or dial pulsing (DP) as follows:

SI3—MF called number
SI4—DP called number
SI5—DP called number plus 2 digits
SI6—DP called number plus 3 digits
SI7—MF called number plus 3 digits
SI8—DP called number less area code
SI9—MF called number less area code
SI10—DP called number plus 5 digits These instructions must be correlated with the switching instructions programmed in the magnetic drum memory store.

Strapping 1707 is provided from relay LA to the trunk grouping field terminal which is associated with the trunk group of the destination of the last alternate. This relay has a break contact LA for disconnecting ground from the lead LA to the sequence and supervisory circuits. Also whenever one of the alternate route relays is operated the relay AR is also operated to provide a signal via its make contacts to lead AR-0 to inform the sequence circuits when an alternate route is provided to enable the alternate route scanner.

Strapping 1711 is provided only when ticketing or special service outlets are accessed. All ticketing and special service trunks should be located on the first three trunk outlet arrays. The trunk grouping leads TG1 to TG18 which are associated with ticketing or special service outlets are strapped to the corresponding ones of the special service identity field leads TL1-1 to TL3-6, namely TG1 strapped to TL1-1, TG2 strapped to TL1-2—TG18 strapped to TL3-6. The relays TL1, TL2 and TL3 provide signals via their make contacts to corresponding leads AL1, AL2 and AL3 to the outlet scanner and selector 164 in the path control circuit where they are combined with the tens identity of the selected outlet to provide one of the digits into the sender for identity of the selected outlet.

The alternate route scanner 171 is shown on the left hand side of FIG. 18, it comprises a counter having flip-flops AR1, AR2 and AR3 along with advance and reset gated pulse amplifiers, and a decoder which supplies five relay drivers which respectively place ground on the leads RS1 to RS5, and the decoder also supplies a signal to the leads R1 to R5. Thus for the primary route the alternate route scanner provides a ground signal via RS1 and a signal via R1.

The remainder of FIG. 18 shows a specific example of the strapping used in the level translator and selector for one specific pair of switching digits namely AC1 and BD1. Thus when this pair of digits is received from the send receive circuit, ground on lead AC1 operates relay AC1 and via one set of its make contacts connects ground via lead BD1 to lead BDF1 of the digit decode field. It is assumed that for this pair of switching digits there is a primary route and three alternative routes. Therefore lead DDF1 is connected to one of the relays of the alternate relay field, shown here as being relay AR1, and one of the relays of a multi-alternate route field, shown here as relay MAR1. Relay AR is also operated via diode CR21 to connect ground to the lead AR–0. For the primary route assume that 25 outlets are required, and therefore the connection from the lead RS1 of the alternate route scanner via contacts of relay AR1 and lead ARD1 is connected via lead MGC1 to one of the multigroup relays, shown here as relay MG1. Ground is connected via contacts of this relay to three leads in the trunk grouping field, namely TG1, TG2 and TG3. Also it is assumed that all of the outlets accessed via these switching digits are ticketing trunks, and therefore there is a connection made from lead TG1 to relay TL1. Also for the primary route the lead R1 from the alternate route scanner via contacts of relay AR1 is connected to provide special instruction SI3.

The first alternate route may comprise twenty trunks and therefore the connection is made from lead RS2 via contacts of relay AR1 to the trunk grouping field leads TG15 and TG16. Since these trunks are in the third array the connection is made from lead TG15 to relay TL3. The special instructions for the first alternate use a connection from lead R2 via contacts of relay AR1 to lead SI3.

For the second alternate ten trunks are required and a connection is made from lead RS3 via contacts of relay AR1 to lead TG7 and also from there to relay TL2. A connection is also made from lead R3 via contacts of relay AR1 to lead SI8 for the special instructions for this route.

For the third alternate ten trunks are required and a connection is made from lead RS4 via contacts of relay MAR1 to lead TG10, and also from there to relay TL2. Since this is the last alternate the lead TG10 is also connected to relay LA. The special instructions use a connection from lead R4 via contacts of relay MAR1 to lead SI4.

Note that in contrast to many prior systems, the outlet levels for the primary and alternate routes may be scanned in any desired order.

SEQUENCE AND SUPERVISORY CIRCUITS

Figure 19:
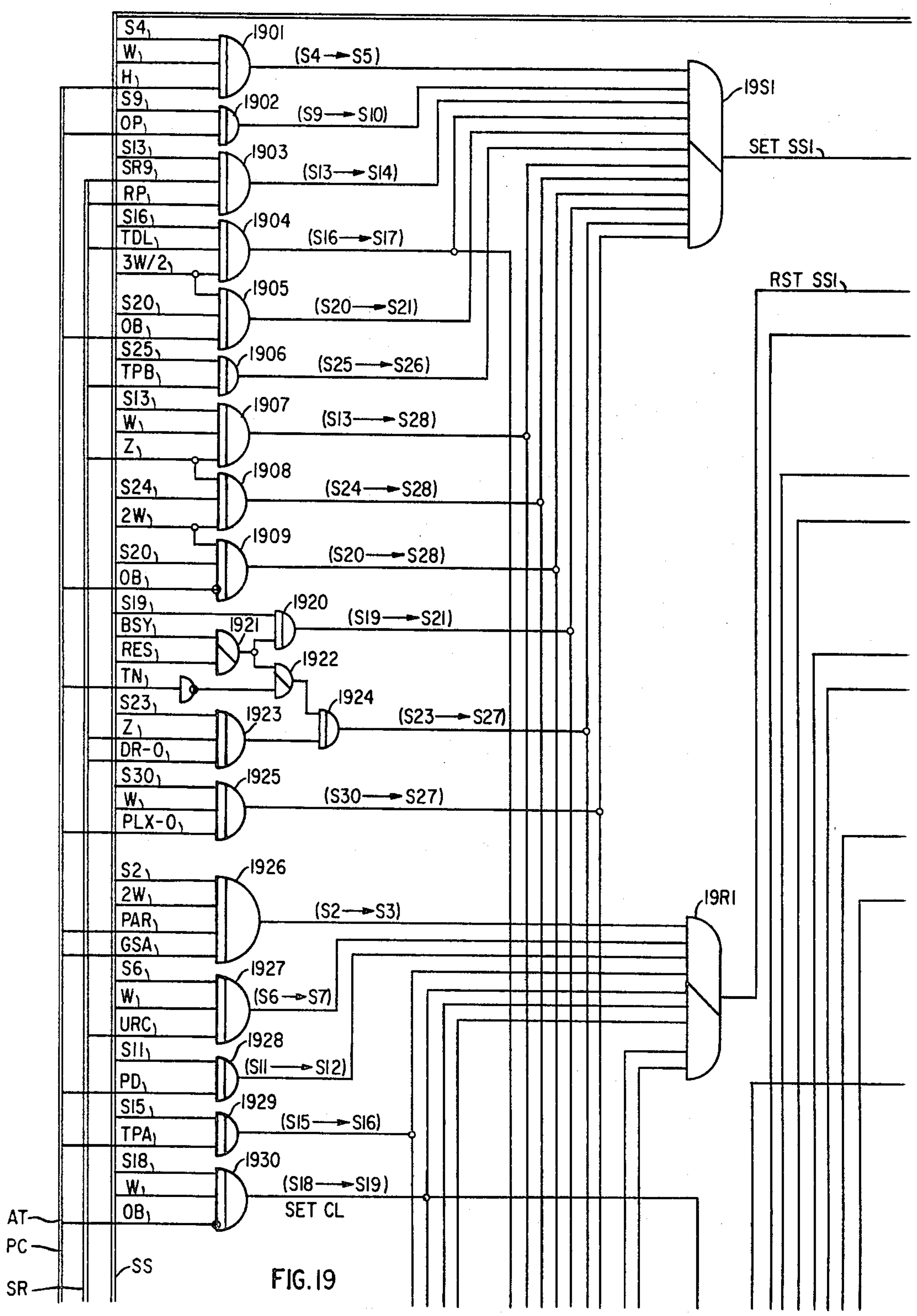
Figure 20:
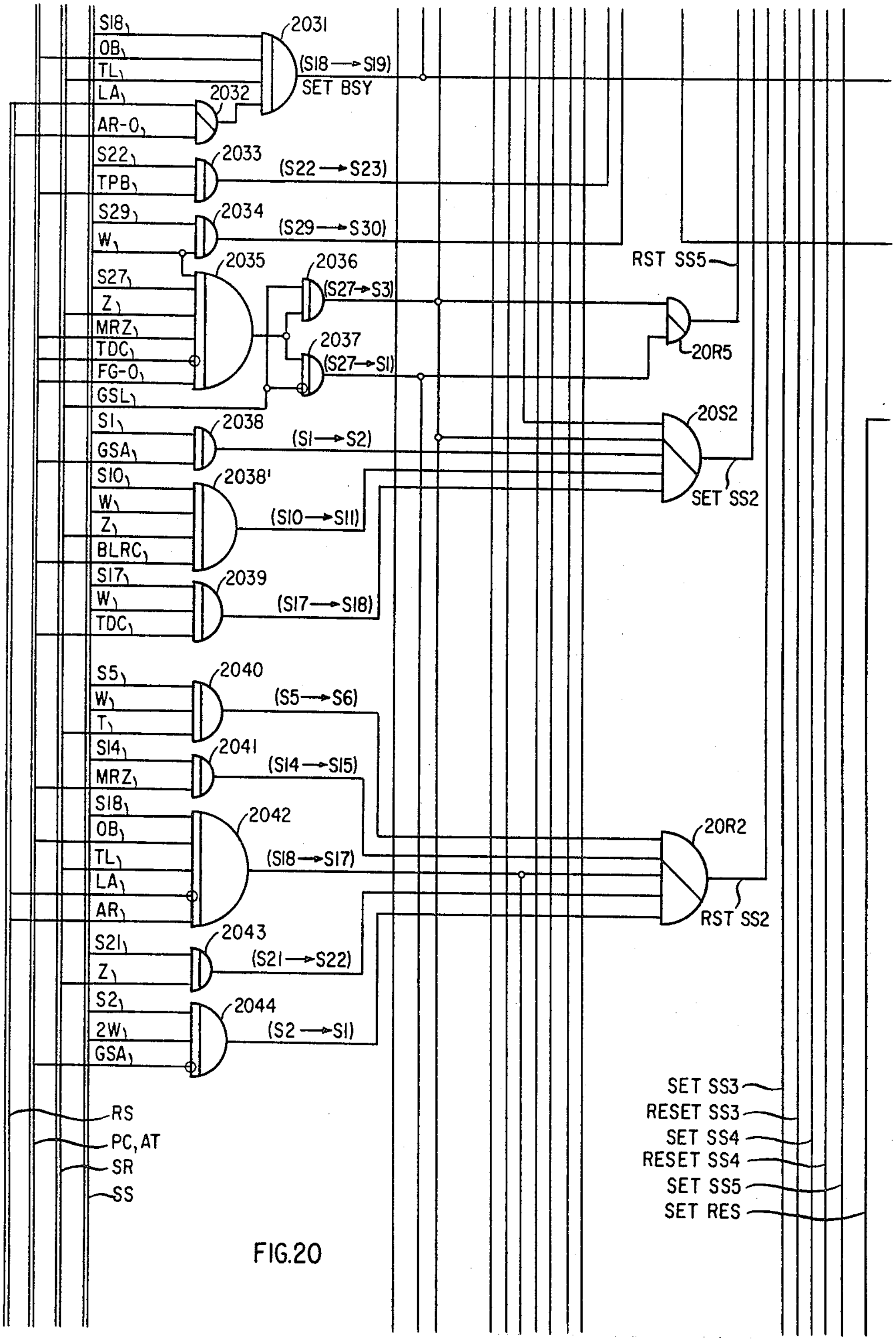
Figure 21:
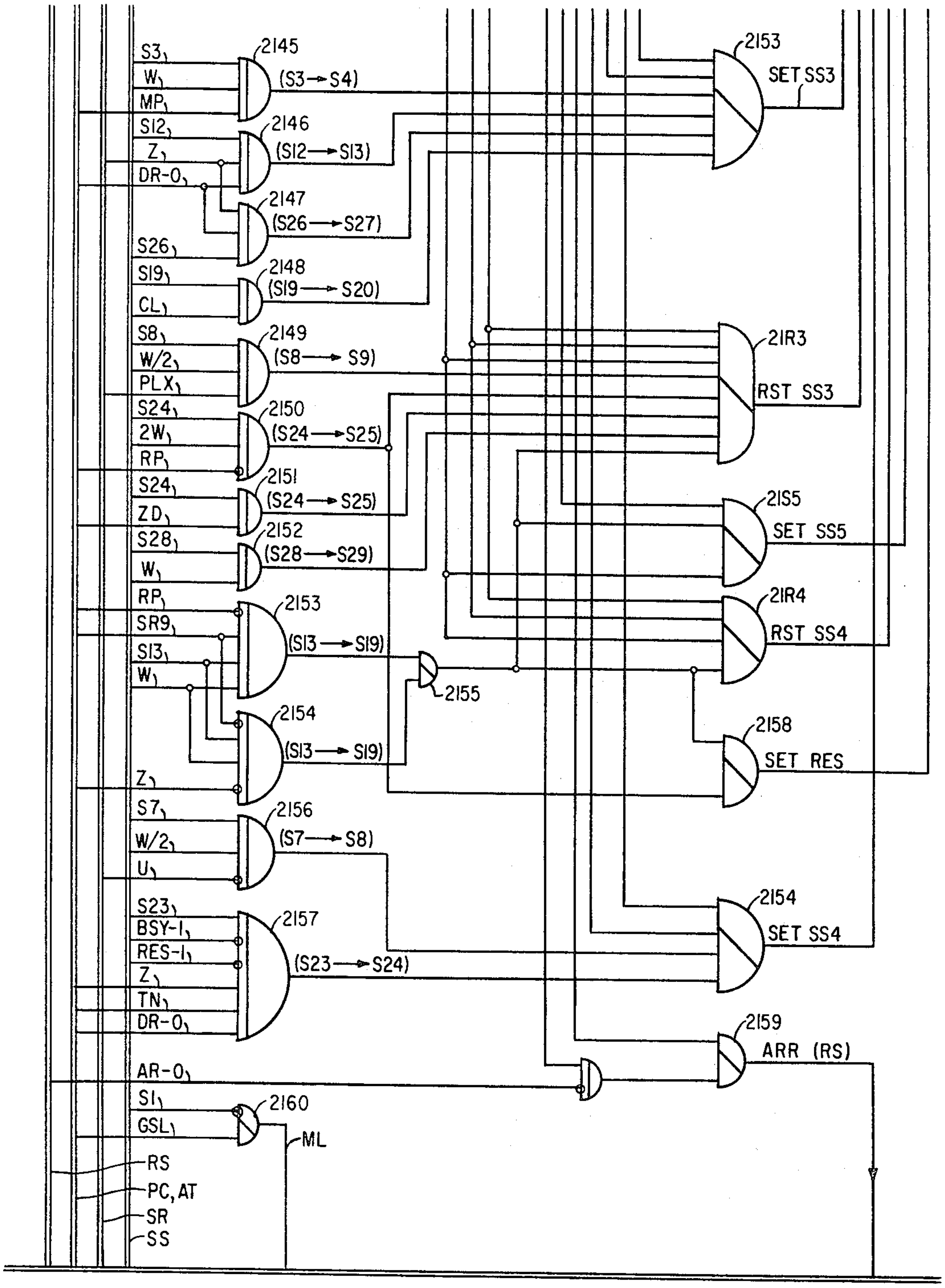
Figure 22:
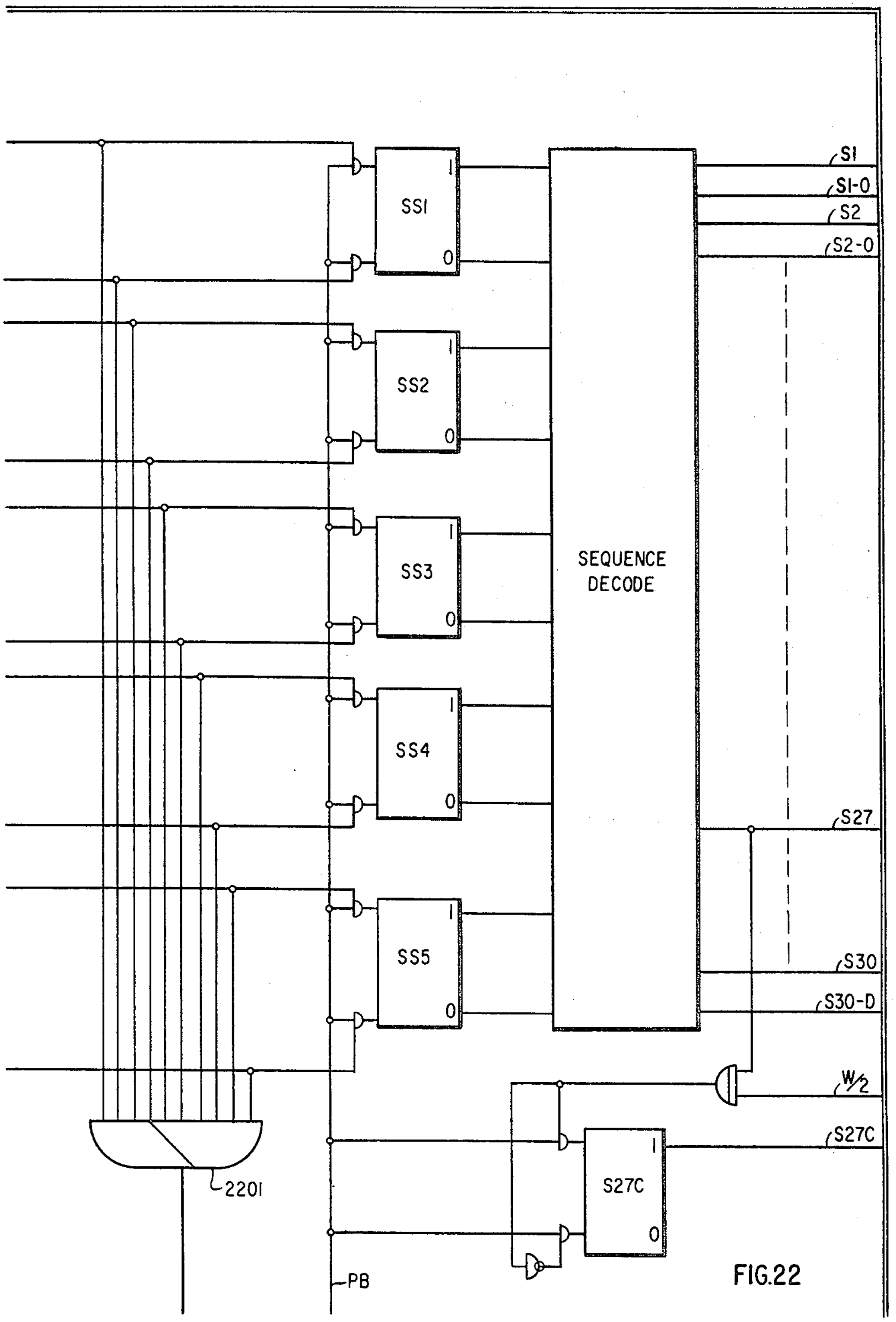
Figure 23:
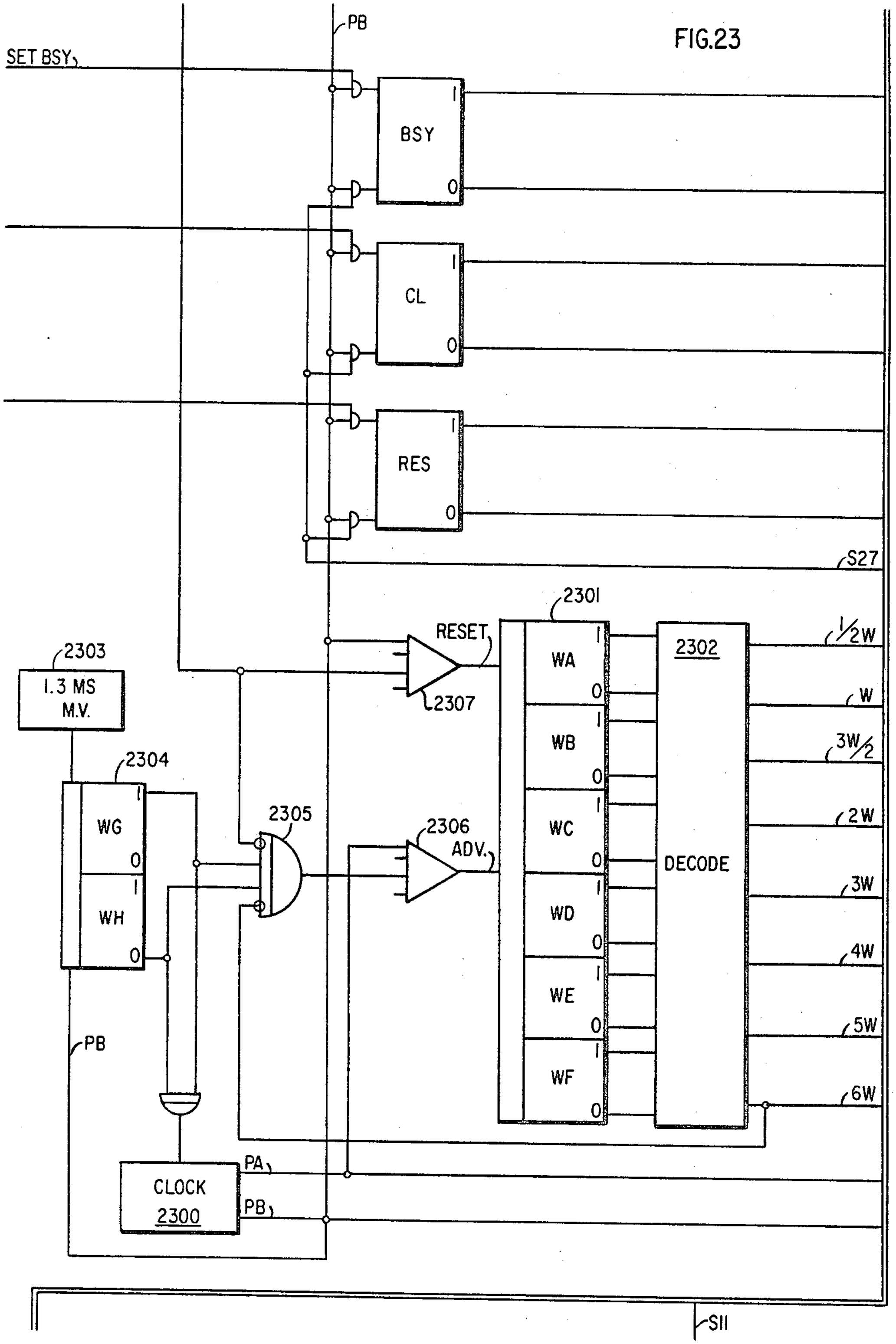
Figure 24:
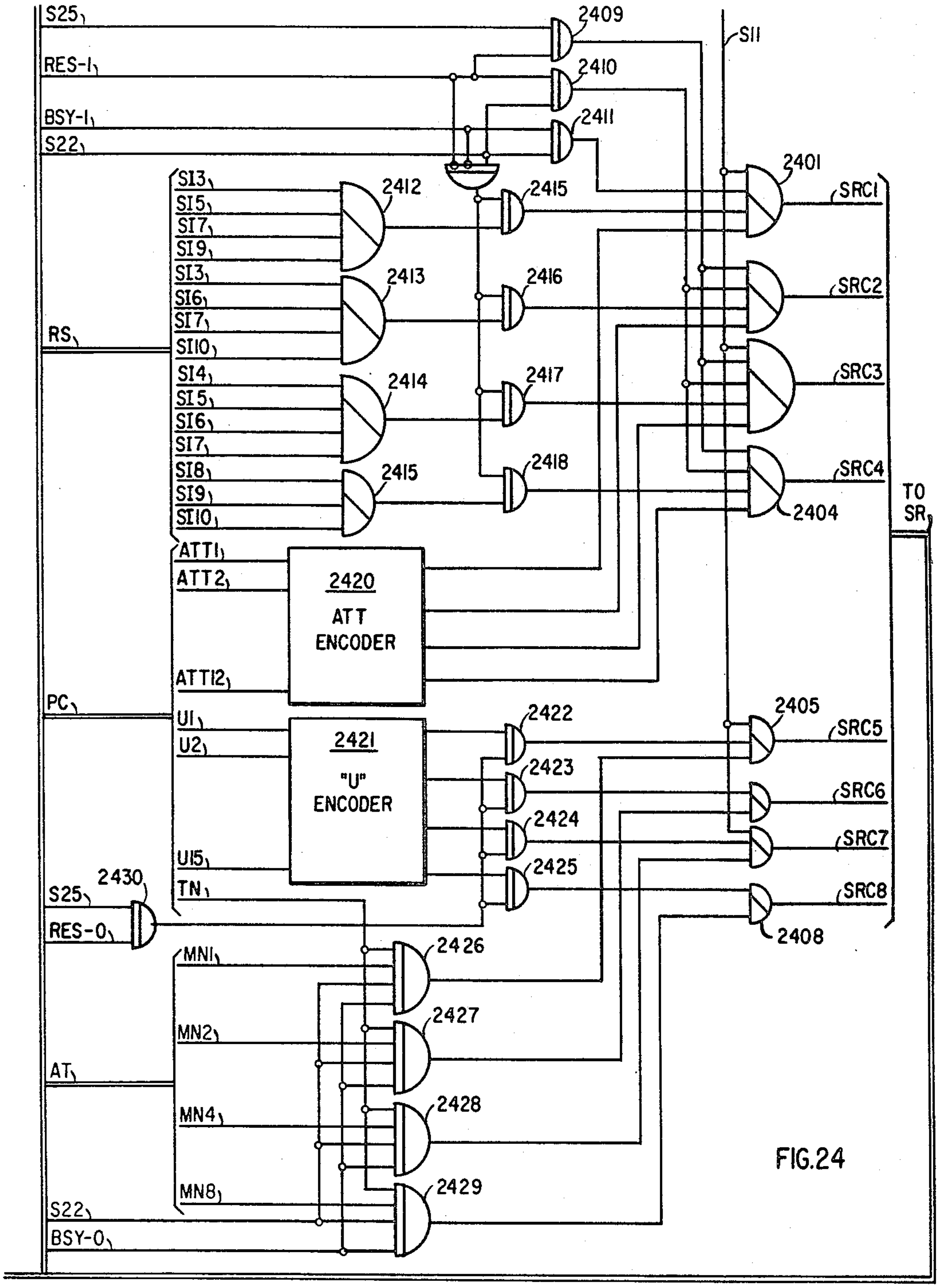

The sequence and supervisory circuit 190 is shown in functional block diagram form in FIGS. 19–24, when arranged as shown in FIG. 28. The sequence state register is shown in FIG. 22, the input control logic for the sequence state register is shown in FIGS. 19, 20 and 21, special flip-flops and function timer circuits are shown in FIG. 23 and encoding logic for information to be transferred via the send receive circuit to the sender is shown in FIG. 24.

The sequence state control register shown in FIG. 22 comprises five flip-flops SS1 to SS5 along with decode logic to provide thirty sequence states. The code in the five flip-flops and the function for each of these states is as follows:

| State | Flip-Flop code | Function |
|---|---|---|
| S1 | 10000 | Allotter operation begins, idle. |
| S2 | 11000 | Allotter operation wait. |
| S3 | 01000 | Operate sensing relays. |
| S4 | 01100 | Hundreds identity. |
| S5 | 11100 | Tens identity. |
| S6 | 10100 | Units identity. |
| S7 | 00100 | Release units identity attach relay. |
| S8 | 00110 | Hold line relay of identified inlet. |
| S9 | 00010 | Break No. 1 coils of line relays. |
| S10 | 10010 | Clear SR Code receiver register. |
| S11 | 11010 | Set priming digit in SR register. |
| S12 | 01010 | Send priming digit. |
| S13 | 01110 | Receive level digits. |
| S14 | 11110 | Clear marker register. |
| S15 | 10110 | Set level digits in marker register. |
| S16 | 00001 | Wait for decode relays. |
| S17 | 10001 | Pull relays in level translator. |
| S18 | 11001 | Operate outlet scanner. |
| S19 | 01001 | Set busy, resend, or clear commands. |
| S20 | 01101 | Pull outlet. |
| S21 | 11101 | Clear code receiver. |
| S22 | 10101 | Set SNI and GSX number in receiver. |
| S23 | 00101 | Send SNI and GSX number. |
| S24 | 00111 | Code receiver ready. |
| S25 | 00011 | Set TT and TU in receiver. |
| S26 | 10011 | Sent TT and TU. |
| S27 | 10111 | Clear complete marker. |
| S28 | 11111 | Re-apply −50 v. to inlet relays. |
| S29 | 11011 | Remove holding −50 v. from inlet relays. |
| S30 | 01011 | Check coincidence. |

In FIG. 23, the clock 2300 is a 25-kilocycle pulse generator for supplying the A.C. trigger pulse inputs of the flip-flops of the entire marker, to thereby synchronize all of the operations of the marker. The clock 2300 also includes apparatus for individual manual generation of the pulses. On each of the output leads PA and PB there appears a train of 1.2-microsecond pulses recurring every 40 microseconds. The beginning of each pulse on lead PB occurs 20 microseconds after the beginning of a pulse on lead PA.

The function timer 2301 comprises six flip-flops WA to WF inclusive along with decode logic 2302 to produce signals for providing wait times in the various sequence states to allow time for the operation of various relays. This timer is reset at the beginning of each sequence state, and after four milliseconds the signal W/2 becomes true and has a four millisecond duration so that it ends at 8 milliseconds. The signal W becomes true after 8 milliseconds from the beginning of the sequence state and the signal 3W/2 becomes true after 12 milliseconds, these two signals ending after 16 milliseconds. The signal 2W becomes true at 16 milliseconds from the beginning of the state and has a duration of 8 milliseconds, and the other signals 3W, 4W, 5W and 6W become true in succession each having a duration of 8 milliseconds. If the signal 6W becomes true in any sequence state this indicates a malfunction and causes the marker to connect itself to the automatic test equipment of the control center. The function timer is driven by a 1.3-microsecond multivibrator 2302 by means of two flip-flops WG and WH, a gate 2305, and a gated pulse amplifier 2306. It is reset at the beginning of each sequence state by gated pulse amplifier 2307 which is enabled via OR gate 2201 each time any one of the sequence control register flip-flops receives an input signal.

The gates which control the changes of the sequence states by generating the D.C. inputs to the sequence control register of FIG. 22, are shown in FIGS. 19, 20 and 21. The A.C. inputs are supplied by the PB clock pulses. The possible state changes are shown in the flow table which follows. The principal gate involved in formulating each command is also listed.

| From | To | Command | Gate |
|---|---|---|---|
| S1 | S2 | S1 GSA | 2038 |
| S2 | S1 | S2 2W $\overline{GSA}$ | 2044 |
| | S3 | S2 2W PAR GSA | 1926 |
| S3 | S4 | S3 MP W | 2145 |
| S4 | S5 | S4 H W | 1901 |
| S5 | S6 | S5 T W | 2040 |
| S6 | S7 | S6 URC W | 1927 |
| S7 | S8 | S7 $\overline{U}$ W/2 | 2156 |
| S8 | S9 | S8 PLX W/2 | 2149 |
| S9 | S10 | S9 OP | 1902 |
| S10 | S11 | S10 Z BLRC W | 2038 |
| S11 | S12 | S11 PD | 1928 |
| S12 | S13 | S12 Z $\overline{DR}$ | 2146 |
| S13 | S14 | S13 SR9 RP | 1903 |
| | S19 (Set RES) | S13 W(SR9 $\overline{RP}$ + $\overline{ZSR9}$ ) | 2155 |
| | S28 | S13 Z W | 1907 |
| S14 | S15 | S14 MRZ | 2041 |
| S15 | S16 | S15 TPA | 1929 |
| S16 | S17 | S16 TDL 3W/2 | 1904 |
| S17 | S18 | S17 TDC W | 2039 |
| S18 | S19 (Set CL) | S18 $\overline{OB}$ W | 1930 |
| | S19 (Set BSY) | S18 OB TL($\overline{AR}$ + LA) | 2031 |
| | S17 | S18 OB TL AR $\overline{LA}$ | 2042 |
| S19 | S20 | S19 CL | 2148 |
| | S21 | S19 (BSY + RES) | 1920 |
| S20 | S21 | S20 OB 3W/2 | 1905 |
| | S28 | S20 $\overline{OB}$ 2W | 1909 |
| S21 | S22 | S21 Z | 2043 |
| S22 | S23 | S22 TPB | 2033 |
| S23 | S24 | S23 $\overline{DR}$ Z TN $\overline{RES}$ $\overline{BSY}$ | 2157 |
| | S27 | S23 $\overline{DR}$ Z($\overline{TN}$+RES+BSY) | 1924 |
| S24 | S25 | S24 ZD | 2151 |
| | S25 (Set RES) | S24 $\overline{RP}$ 2W | 2150 |
| | S28 | S24 Z 2W | 1908 |
| S25 | S26 | S25 TPB | 1906 |
| S26 | S27 | S26 Z $\overline{DR}$ | 2147 |
| S27 | S1 | S27 Z MRZ $\overline{TDC}$ $\overline{FG}$ $\overline{GSL}$ W | 2037 |
| | S3 | S27 Z MRZ $\overline{TDC}$ $\overline{FG}$ GSL W | 2036 |
| S28 | S29 | S28 W | 2152 |
| S29 | S30 | S29 W | 2034 |
| S30 | S27 | S30 $\overline{PLX}$ W | 1925 |

Encoding circuits for information to be loaded into the send-receive circuit shift register for transmission to the sender are shown in FIG. 24. There are three sequence states, namely S12, S23 and S26 in which information may be sent from the marker via the send-receive circuit to the sender. In each case the information to be transmitted is sent into the shift register during the preceding sequence state via the eight leads SRC1–SRC8 from FIG. 24 to FIG. 14.

The information transmitted during state S12 is the priming digit which informs the sender that the marker is ready to receive the level digits. The priming digit is the code 1010 1010, and is set via OR gates 2401 to 2408 to the leads SRC1–SRC8 in response to the signal S11.

Information transmitted in the other sequence states is divided into two digits in binary code of four bits each, the first digit being encoded via leads SRC1–SRC4, and a second digit via leads SRC5–SRC8. During state S23 the first digit may be used to indicate "clear," "trunk busy," or "resend"; or if the level digits indicated a destination having an alternate route this first digit is used for the special instructions to the sender. If the selected trunk is a ticketing trunk the second digit transmitted during state S23 identifies the group selector in which the outlet appears. These two digits are set into the shift register during state S22, and therefore the signal S22 is used to enable gate 2411, gates 2415–2418, and gates 2426–2429. If there is a trunk busy condition the signal BSY–1 is true and via gate 2411 sets the digit "1" (binary 1000) in the first digit position via gate 2401. If there is a resend condition the signal RES–1 is true and via gate 2410 sets the digit "14" (binary 0111) in the first digit position. If the destination has an alternate route, one of the signals SI3–SI10 is true and is encoded via the gates 2412–2415 and supplied via gates 2415–2418 and gates 2401–2404 to the first digit position. If the outlet is one requiring ticketing the allotter has encoded the identity of the group selector via leads MN1, MN2, MN4, and MN8. Also the signals TN, and BSY–0 will be true along with signal S22 to enable the gates 2426–2429 to gate this code via gates 2405–2408 to the second digit position. If an outlet has been successfully selected and there is no alternate route special instructions or ticketing information, the clear command (0000 0000) is transmitted to the sender. If there is no ticketing information the sequence state at this point is advanced to the clear state S27.

If ticketing is required, the signal TN being true, the two additional digits identifying the outlet must be transmitted during state S26. Therefore during state S25 this information is supplied from FIG. 16 via encoders 2420 and 2421 to the two digit positions. For the ticketing tens digit TT the signal S25 via gate 1610 enables the gates which supply one of the signals ATT1–ATT12 to encoder 2420 and thence via gates 2401–2404 to the first digit position. For the ticketing units digit TU the signal S25 enables gate 2430 to in turn enable gates 2422–2425 to supply the output from the units encoder 2421 into the second digit position.

OPERATION OF GROUP SELECTOR MARKER

To explain the operation of the group selector marker, assume that a call is received at inlet circuit 410 (FIG. 6). Ground on lead EC operates the line relay L via break contacts of the cutoff relay CO, diode 601, the upper winding of the line relay, lead IC, and break contacts of relays BLRA and BLRC to negative battery potential. Operation of the line relay causes a call request signal in the form of negative battery potential to be applied via break contacts of relays SPC and SPA to lead SC and thence via resistor 602 and make contacts of relay L to lead P. This negative potential extends through the pull windings and the series diodes of the A, B, and C matrices, and is extended from the horizontal P leads of the C matrix to leads CA1 and CA10 (FIG. 13) to the allotter.

STATE S1

When there are no call requests waiting to be served the sequence normally remains in state S1. A signal $ML=(\overline{S1}+GSL)$ when false enables the allotter, so that it is conditioned to respond to any call request which arises in any of the group selectors which it is serving. The allotter then selects the group selector in which the call appears, which is assumed to be group selector 1, and locks out all the other group selectors associated with this marker, ground on lead GS1 operates the relay GS, and the signal GSA is transmitted to the sequence circuits.

The command (S1 GSA) at gate 2038 advances the sequence to state S2.

STATE S2

State S2 provides an allotter operation wait interval of 16 milliseconds after which the signal 2W is true. The allotters of marker A and marker B also check parity between them and if they agree, the signal PAR is true. The signal ML at gate 2160 becomes true and locks the allotter to the selected group selector. The signal GSA becomes false in the allotter. The command (S2 PAR 2W GSA) at gate 1926 advances the sequence to state S3.

STATE S3.—OPERATE HUNDREDS SENSING RELAYS

The signal SHC from gate 1191 becomes true and operates relay driver 1120 which via lead MSH operates relay HSA in the connect circuits, thereby connecting the C-matrix vertical P leads to the hundreds scanner.

The P leads from both matrix C1 and matrix C10 are connected to the input of the hundreds scanner. If there is parity between these signals the signal MP is true. Also whenever there is a call in the group selector to which the marker is connected the signal GSL is true indicating a call request in the marker. After 8 milliseconds in state S3 the signal W becomes true, and the command (S3 MP W) at gate 2145 advances the sequence to state S4.

STATE S4.—HUNDREDS IDENTITY

The signal S4 actuates the hundreds scanner. When the hundreds digit is identified the scanner stops and the signal H becomes true. One of the six relays HA1 to HA6 corresponding to the identified hundreds digit is operated in the connect circuits, thereby connecting the B matrix horizontal P terminals to the tens identifier. After 8 milliseconds the signal W becomes true, and the command (S4 H W) at gate 1901 advances the sequence to state S5.

STATE S5.—TENS IDENTITY

The signal S5 enables the tens scanner. During states S5 and S6 relay driver 1119 operates the relay BTC to close the input leads to the tens scanner. When the tens digit is identified signal T becomes true and the scanner is stopped. Negative potential is applied to one of the leads and MHT1–MHT0 corresponding to the identified tens digit, and ground potential from contacts of the operated hundreds identity connect relay, so that one of the sixty HT relays HT1–HT60 is operated, thereby connecting the A matrix vertical P terminals of five inlet circuits to the input of the units scanner. After 8 milliseconds of signal W becomes true and the command (S5 T W) at gate 2040 advances the sequence to state S6.

STATE S6.—UNITS IDENTITY

Signal S5 enables the units scanner. When the units digit is identified the scanner is stopped and the signals U and URC become true. The signal U indicates that the units identity is complete and the signal URC indicates that a units relay is operated. After 8 milliseconds the signal W becomes true and the command (S6 URC W) at gate 1927 advances the sequence to state S7.

STATE S7.—RELEASE IDENTITY

The signal PUB is true during states S3 through S6 inclusive and in state S30, and therefore at this time becomes false and via relay driver 1116 releases relay UBR, and thereby disconnects the input leads to the units scanner. This causes the signal U to become false. After four milliseconds the command (S7 $\overline{U}$ W/2) at gate 2156 advances the sequence to state S8.

STATE S8.—HOLD LINE RELAY OF INLET

The signal APP is false during states S1 through S7 and in states S27 and S28, and therefore becomes true at this time, operating relay driver 1118. This extends negative battery potential via resistor 1181 to the relay tree through the connect circuits to the P lead of the selected inlet, which holds the line relay L via its lower winding. The negative battery potential from the contacts of relay driver 1118 also via inverter 1117 produces a ground potential on lead PLX–0 (signal PLX true). After four milliseconds the command (S8 PLX W/2) at gate 2149 advances the sequence to the state S9.

STATE S9.—BREAK UPPER WINDINGS OF LINE RELAYS

During states S9 and S10, relay drivers 1111 and 1112 apply ground potential to leads BLVA and BLVB, operating relays BLRA and SPA in the connect circuits which in turn complete circuits to operate relays BLRC and SPC respectively. Negative battery potential is thereby removed from leads IC and SC via break contacts of these relays. The relays are all now locked operated. Thus via lead IC the upper windings of all of the line relays are opened, and via lead SC negative battery potential is removed from the P leads of all the inlet circuits. Ground potential is removed via break contacts of relays BLRC and SPC from lead MOP which extends via the transfer circuit to lead OP, making the signal OP true. Ground potential is applied via make contacts of relays BLRC and SPC to lead MBLC–0, through the transfer circuit to lead BLRC–0, making the signal BLRC true. The command (S9 OP) via gate 1902 advances the sequence to S10.

STATE S10.—CLEAR CODE RECEIVER SHIFT REGISTER

A signal from gate 1403 becomes true and enables gated pulse amplifier 1412 to clear the transceiver shift register. With all 12 shift-register flip-flops and flip-flop PY reset, the signal Z from gate 1526 becomes true. The command (S10 Z BLRC W) at gate 2038 advances the sequence state to S11.

STATE S11.—SET PRIMING DIGIT IN TRANSCEIVER SHIFT REGISTER

The signal S11 via gates 2401–2408 to the leads SCR1–SCR8 to the D.C. inputs, and a signal via gate 1403 and gated pulse amplifier 1401 to the A.C. set inputs loads the priming digit 10101010 into the shift register flip-flops SR1–SR8. The signal PD from gate 1516 indicates that the priming digit has been correctly loaded. The command (S11 PD) at gate 1928 advances the sequence to state S12.

STATE S12.—SEND PRIMING DIGIT

The signal condition (S12 $\overline{Z}$) from gates 1503 and 1504 enables gated pulse amplifier 1510 to set the flip-flops EP and DR. The signal EP–1 from flip-flop EP is the send command to the transceiver, causing the priming digit to be transmitted to the sender transceiver. After completion of transmission the signal Z indicating all zeros in the shift register becomes true and the command (S12 Z DR–0) via gate 2146 advances the sequence to state S13.

STATE S13.—RECEIVE LEVEL DIGITS

The signal RSS from gate 1405 becomes true and supplies the receive command to the transceiver. The level digits are received from the sender, the flip-flop SR9 being set at the end of receive. Also if the transmission has been correct, at the zero output of flip-flop PY the receiving parity signal RP is true.

If the digits have not been correctly received, the command (S13 SR9 $\overline{RP}$ W) or the command (S13 $\overline{Z}$ $\overline{SR9}$ W) via gate 2155 advances the sequence to state S19 and sets the resend flip-flop RES. If on the other hand there are all zeros in the flip-flops, the command (S13 Z W) via gate 1907 advances the sequence to state S28.

However, assuming that the level digits have been correctly received the command (S13 SR9 RP) at gate 1903 advances the sequence to state S14.

STATE S14.—CLEAR MARKER REGISTER

The signal from gate 1507 becomes true and via gated pulse amplifier 1502 resets the marker register flip-flops MR1–MR8. This causes the signal MRZ from zero decoding gate 1513 to become true. The command (S14 MRZ) at gate 2041 advances the sequence to state S15.

STATE 15.—SET LEVEL DIGITS IN MARKER REGISTER

The signal S15 via gated pulse amplifier 1501 causes the level digits from the shift register to be loaded into the marker register flip-flops MR1–MR8. Signal TPA from parity circuit 1505 indicates transfer parity from the shift register to the marker register. The command (S15 TPA) at gate 1929 advances the sequence to state S16.

STATE 16.—WAIT FOR DECODE RELAYS

When the level translator gates have operated, the signal TDL from gate 1571 becomes true. After 12 milliseconds the command (S16 TDL 3W/2) at gate 1904 advances the sequence to state S17.

STATE S17.—PULL RELAYS IN LEVEL TRANSLATOR

In the level translator selector FIG. 17, the signals from the marker register via the digit decode field, in accordance with the strapping provided produces a signal on one to six of the trunk grouping leads in a single outlet array which in FIG. 10 operates a corresponding one of the array relays AL1–AL20, and a corersponding one to six of the trunk grouping relays 1G1–20G10. The latter relays connect idle test leads to some or all of the input leads MIT1–MIT60 of the trunk scanner and selector in groups of ten. The array relay places ground on lead MAL which extend to lead AL making the signal false and via inverter 1341 making signal TDC true. The command (S17 TDC W) at gate 2039 advances the sequence to state S18.

STATE S18.—OPERATE TRUNK SCANNER

The signal from gate 1622 via gated pulse amplifier 1601 enables the outlet scanner and selector. Assume that all of the trunks from the primary route are busy and that there is an alternate route. Then when the "last trunk" signal TL becomes true the outlet busy signal OB remains true. Since there is an alternate route, the relay AR in FIG. 17 is operated and places ground on the lead AR–0, so that signal AR is true. Also, the "last alternate" relay LA has not operated so that signal LA is at ground potential therefore false. The command (S18 OB TL $\overline{\text{LA}}$ AR) at gate 2042 returns the sequence to state S17.

STATE S17

The level translator and selector FIG. 17 now supplies signals to operate one of the array relays AL1–AL20 and one to six of the group relays of that array in accordance with the outlets for the alternate route, and the ground on lead AL makes signal TCD true as before. The command (S17 TDC W) advances the sequence to state S18.

STATE S18

The outlet scanner now operates as before with the new inputs connected thereto for the alternate route.

If a scanner reaches the last trunk and that is busy, and this is the last alternate so that the signal LA becomes true (or if there is no alternate route then the signal AR is false) the command (S18 OB TL ($\overline{\text{AR}}$+LA)) at gate 2031 would advance the sequence to state S19 and set the busy flip-flop BSY.

However, assume that an idle outlet on the alternate route level is found. Then the signal OB becomes false and the scanner is stopped. The command (S18 $\overline{\text{OB}}$ W) via gate 1930 advances the sequence to state S19 and the flip-flop CL is set.

STATE S19.—SET BUSY, RESEND, OR CLEAR COMMANDS

If the busy or resend flip-flop has been set, when the sequence is in state S19 the signal (S19 BSY+RES) from gate 1920 would advance the sequence to state S21.

However, it has been assumed that the clear flip-flop CL has been set, so that the command (S19 CL) from gate 2148 advances the sequence to state S20.

STATE S20.—PULL OUTLET

The signal S20 at relay driver 1340 places ground potential via a 100-ohm resistor and thence via the connected relay tree in the connect circuit to the P lead of the C matrix outlet which has been selected. Negative battery potential remains applied via the identifier relay tree to the P lead of the inlet circuit so that the crosspoints in the three stages operate in series via a unique path. The connection is held via the C lead and operates the cutoff relay CO. The outlet should become busy and cause the signal OB to become true. If it does not, the command (S20 $\overline{\text{OB}}$ 2W) at gate 1909 advances the sequence to state S28. However assuming that the operation proceeds normally, the command (S20 OB 3W/2) at gate 1905 advances the sequence to state S21.

STATE S21.—CLEAR SEND-RECEIVE CIRCUIT

The signal from gate 1404 again becomes true and via gated pulse amplifier 1412 clears the shift register and causes the single Z to become true. The command (S21 Z) at gate 2043 advances the sequence to state S22.

STATE S22.—SET SNI AND GSX NUMBER IN RECEIVER

The level translator and selector FIG. 17 via the special instruction field sends a signal on one of the special instruction leads SI3–SI10 to gates 2412–2415 which via gates 2145–2148 encode the special instruction on leads SRC1–SRC4. If ticketing of the outlet is required, the group selector identity is supplied from the allotter via leads MN1–MN8 to the gates 2426–2429 and thence via gates 2405–2408 to encode the identity on leads SRC5–SRC8. The coded digits on the leads SRC1–SRC8 are loaded into the shift register flip-flops and transmitted to the sender. The signal TPB from parity circuit 1506 indicates correct loading and the command (S22 TPB) at gate 2033 advances the sequence to state S23.

STATE S23.—SEND SNI AND GSX NUMBER

The signal from gate 1504 enables gated pulse amplifier 1510 to set the flip-flops EP and DR and thereby causes transmission to the sender to proceed. A signal TN from gate 1638 indicates whether or not ticketing is required. If ticketing is not required, or if one of the flip-flops RES or BSY had been set, the command (S23 $\overline{\text{DR}}$ Z($\overline{\text{TN}}$+RES+BSY)) from gate 1924 advances the sequence directly to state S27.

However, we have assumed that ticketing is required so that signal TN is true. Then at the end of transmission when the signal Z becomes true the command (S23 $\overline{\text{DR}}$ Z TN $\overline{\text{RES}}$ $\overline{\text{BSY}}$) from gate 2157 advances the sequence to the state S24.

STATE S24.—CODE RECEIVER READY

The sender makes a return transmission of two blank digits which however on completion has flip-flops SR0 and SR9 set, which produces a signal ZD from gate SR1–22. The command (S24 ZD) from gate 2151 advances the sequence to state S25.

STATE S25.—SET TT AND TU IN RECEIVER

In response to the signal condition (S25 $\overline{\text{RES}}$) from gate 2430 which enables gates 2422–2425, and from gate 1610 enables the gates to leads ATT1–ATT12 the digit TT is supplied from the encoder 2420 to leads SRC1–SRC4; and the digit TU is supplied from the encoder 2421 to the leads SRC5–SRC8, and these digits are loaded into the shift register flip-flops SR1–SR8. The loading parity signal TPB becomes true and the command (S25 TPB) from gate 1906 advances the state to S26.

STATE S26.—SEND TT AND TU

The signal from gate 1504 enables gated pulse amplifier 1510 to cause transmission to the sender to proceed. At the end of transmission the command (S26 Z $\overline{\text{DR}}$) at gate 2147 advances the sequence to state S27.

STATE S27.—CLEAR COMPLETE MARKER

The marker is now cleared.

The signal SHC from gate 1191 is true during state S27 so that the relay driver 1120 is operated which in turn operates relay HSA to connect the C matrix vertical P terminals to the hundreds scanner. If there is another call in the same group selector matrix the signal GSL is true, and the command (S27 Z MRZ $\overline{\text{TDC}}$ $\overline{\text{FG}}$ GSL W) via gate 2036 sets the sequence to state S3 to initiate a new new cycle for the next call.

If the signal GSL is false command (S27 Z MRZ $\overline{TDC}$ $\overline{FG}$ $\overline{GSL}$ W) from gate 2037 returns the sequence to the idle state S1. If there is a call awaiting in another group selector matrix served by this marker, the cycle will then begin to handle that call. Otherwise the marker remains idle in state S1 until a call request is received in one of the group selectors.

While we have described above the principles of our invention in connection with specific apparatus, it is to be clearly understood that this description is made only by way of example and not as a limitation to the scope of our invention.

What is claimed is:

1. In a communication switching system, a switching unit having a switching network, a plurality of inlet circuits individually connecting lines to said network and swtiching control apparatus which includes inlet identification means and signal equipment;

each inlet circuit having a line relay connected to its line to operate in response to a service request signal received via the line, the line relay having contacts which in the operated condition connect a call potential to said identification means and other contacts which in the operated condition connect the line to said signal equipment;

a relay tree between a source of potential and the line relays of said inlet circuits;

means including the identification means to select only one inlet circuit having the call potential connected and to operate said relay tree to connect the source of potential to the line relay of the selected inlet circuit and to supply a holding connection for that relay;

means to then release all of the line relays of said switching unit except the one having said holding connection, whereby only the inlet circuit selected by the identification means has its line connected via its line relay contacts to the signal equipment regardless of service requests on other of the lines.

2. In a communication switching system having a switching unit comprising a switching network, a plurality of inlet circuits connecting lines to terminals at one side of the network, an individual line relay in each inlet circuit which operates in response to a call request on ts line to supply a call potential via a set of its contacts, switching control apparatus for establishing connections between a network terminal of an inlet requesting service and a terminal at the other side of the network, there being an inlet identification arrangement in the control apparatus which responds to the call potential to identify a calling inlet and to cause a marking potential to be applied to a marking conductor at the corresponding network terminal, and a signal receiver for connection to the selected calling line to receive signals identifying the destination of the call for use by the control apparatus to select the terminal at the other side of the network;

the improvement comprising providing contacts on each line relay which in the operated condition establish said connection of the corresponding line to the signal receiver, a connection of each line relay to the marking conductor of the corresponding network terminal to hold the line relay from said marking potential, and means to release all of the line relays except the one so held so that only the selected inlet circuit has its line connected to the signal receiver.

3. In a communication switching system, the combination as claimed in claim 2, wherein each said line relay comprises first winding means connected to the corresponding line and second winding means connected to said marking conductor, and said means to release all except one line relay comprises means to disable the first winding means of all of the line relays.

4. In a communication switching system, the combination as claimed in claim 3, wherein said first winding means comprises a winding connected between a control conductor of the corresponding line and a multiple connection of all the line relays to a common potential source, and said means to disable comprises switching means to disconnect the common source from said multiple connection.

5. In a communication switching system having common control equipment comprising register means, translator means, and sender means; a selector switching unit having a plurality of outlets connected in groups to trunks extending to different destinations, said selector switching unit including a marker having signal equipment for connection to the sender means; the system being so arranged that in a given call digital signals are stored in the register means and then supplied to the translator means, which in turn supplies switching digits and sending instructions, the sender means transmits a portion of the switching digits designating a destination to the selector-marker signal equipment, which causes the selector marker to make a busy test of the corresponding outlets and operate the selector unit to extend a connection to a selected idle outlet, the sender means then transmitting switching digits in accordance with said instructions via the trunk corresponding to the selected outlet;

the improvement comprising an arrangement in the selector in which the outlets for a given destination designated by switching digits received in the signal equipment include primary route outlets and alternate route outlets, means included in the selector marker using only said portion of the switching digits designating a destination, which are received only once in said selector marker signal equipment, to first test the primary route outlets and responsive to them all being busy to then test the alternate route outlets, and means included in the marker responsive to selection of an alternate route outlet to supply sending instructions for that route to the signal equipment for transmission to the same said sender means, said sending instructions being indicative of how to select and send digits stored in the register means.

6. In a communication switching system, the combination as claimed in claim 5, wherein there are a plurality of alternate routes, and the selector marker includes means to select and supply to the signal equipment the sending instructions as required for the particular alternate route which includes the selected outlet.

7. In a communication switching system, the combination as claimed in claim 6, wherein said sending instructions include a designation of which of the switching digits from the translator means are to be sent via the trunk connected to the selected outlet, and the mode of sending required.

8. In a communication switching system, the combination as claimed in claim 7, wherein the possible modes of sending include direct-current pulsing and multifrequency pulsing.

9. In a communication switching system, the combination as claimed in claim 7, wherein said selector switching unit includes a strapping field providing options which may be connected so that for any given switching digits received in the signal equipment the outlet groups may be used as primary route and the various alternate routes in any order.

10. In a communication switching system, the combination as claimed in claim 5, wherein some of said trunks require ticketing, and wherein said selector switching unit includes means responsive to an indication that the selected outlet is connected to a trunk requiring ticketing to supply the identity of the outlet to the signal equipment for transmission to the sender means.

11. In a communication switching system, the combination as claimed in claim 5, wherein said selector switching unit includes inlet circuits connecting lines to selector input terminals, each inlet circuit having a line relay connected to its line to respond to a service request to supply a call potential, means responsive to a call potential to identify a calling inlet circuit and connect a marking potential to a marking conductor at the corresponding selector terminal, a connecting from the marking terminal to the line relay to supply a holding circuit thereto, means to release the line relays at all calling line inlets except the one having said holding connection, and contact means on each line relay which in the operated condition connect the line at the inlet to said signal equipment to thereby complete a path from the sender means via the line to the signal equipment.

References Cited

UNITED STATES PATENTS

| | | |
|---|---|---|
| 2,857,467 | 10/1958 | Molnar. |
| 3,098,125 | 7/1963 | Berch. |

WILLIAM C. COOPER, *Primary Examiner.*